(12) United States Patent
Taylor et al.

(10) Patent No.: US 9,047,243 B2
(45) Date of Patent: Jun. 2, 2015

(54) METHOD AND APPARATUS FOR LOW LATENCY DATA DISTRIBUTION

(75) Inventors: David E. Taylor, St. Louis, MO (US); Scott Parsons, St. Charles, MO (US); David Vincent Schuehler, St. Louis, MO (US); Todd Alan Strader, Hazlet, NJ (US); Ryan L. Eder, Manchester, MO (US)

(73) Assignee: IP RESERVOIR, LLC, St. Louis, MO (US)

( * ) Notice: Subject to any disclaimer, the term of this patent is extended or adjusted under 35 U.S.C. 154(b) by 99 days.

(21) Appl. No.: 13/440,118

(22) Filed: Apr. 5, 2012

(65) Prior Publication Data

US 2013/0159449 A1    Jun. 20, 2013

Related U.S. Application Data

(60) Provisional application No. 61/570,670, filed on Dec. 14, 2011.

(51) Int. Cl.
   *G06F 15/167*    (2006.01)
   *G06F 15/173*    (2006.01)

(52) U.S. Cl.
   CPC ........ *G06F 15/167* (2013.01); *G06F 15/17331* (2013.01)

(58) Field of Classification Search
   CPC ........................ G06F 15/167; G06F 15/17331
   USPC ................................. 709/213, 214, 212, 216
   See application file for complete search history.

(56) References Cited

U.S. PATENT DOCUMENTS

| | | |
|---|---|---|
| 4,300,193 A | 11/1981 | Bradley et al. |
| 5,163,131 A | 11/1992 | Row et al. |
| 5,249,292 A | 9/1993 | Chiappa |
| 5,347,634 A | 9/1994 | Herrell et al. |
| 5,404,488 A | 4/1995 | Kerrigan et al. |
| 5,421,028 A | 5/1995 | Swanson |
| 5,596,569 A | 1/1997 | Madonna et al. |
| 5,802,290 A | 9/1998 | Casselman |
| 5,864,738 A | 1/1999 | Kessler et al. |
| 5,987,432 A | 11/1999 | Zusman et al. |
| 6,006,264 A | 12/1999 | Colby et al. |
| 6,067,569 A | 5/2000 | Khaki et al. |
| 6,105,067 A | 8/2000 | Batra |

(Continued)

FOREIGN PATENT DOCUMENTS

| | | |
|---|---|---|
| WO | 199409443 A1 | 4/1994 |
| WO | 2000041136 A1 | 7/2000 |

(Continued)

OTHER PUBLICATIONS

International Search Report and Written Opinion for PCT/US2012/069142 dated Feb. 22, 2013.
Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.

(Continued)

*Primary Examiner* — Hee Soo Kim
(74) *Attorney, Agent, or Firm* — Thompson Coburn LLP; Benjamin L. Volk, Jr.

(57) ABSTRACT

Various techniques are disclosed for distributing data, particularly real-time data such as financial market data, to data consumers at low latency. Exemplary embodiments include embodiments that employ adaptive data distribution techniques and embodiments that employ a multi-class distribution engine.

99 Claims, 16 Drawing Sheets

(56) References Cited

U.S. PATENT DOCUMENTS

| | | |
|---|---|---|
| 6,226,676 B1 | 5/2001 | Crump et al. |
| 6,272,616 B1 | 8/2001 | Fernando et al. |
| 6,279,140 B1 | 8/2001 | Slane |
| 6,336,150 B1 | 1/2002 | Ellis et al. |
| 6,370,592 B1 | 4/2002 | Kumpf |
| 6,397,259 B1 | 5/2002 | Lincke et al. |
| 6,412,000 B1 | 6/2002 | Riddle et al. |
| 6,430,272 B1 | 8/2002 | Maruyama et al. |
| 6,484,209 B1 | 11/2002 | Momirov |
| 6,499,107 B1 | 12/2002 | Gleichauf et al. |
| 6,581,098 B1 | 6/2003 | Kumpf |
| 6,601,104 B1 | 7/2003 | Fallon |
| 6,604,158 B1 | 8/2003 | Fallon |
| 6,625,150 B1 | 9/2003 | Yu |
| 6,704,816 B1 | 3/2004 | Burke |
| 6,710,702 B1 | 3/2004 | Averbuch et al. |
| 6,711,558 B1 | 3/2004 | Indeck et al. |
| 6,765,918 B1 | 7/2004 | Dixon et al. |
| 6,807,156 B1 | 10/2004 | Veres et al. |
| 6,820,129 B1 | 11/2004 | Courey, Jr. |
| 6,847,645 B1 | 1/2005 | Potter et al. |
| 6,870,837 B2 | 3/2005 | Ho et al. |
| 6,877,044 B2 | 4/2005 | Lo et al. |
| 6,931,545 B1 | 8/2005 | Ta et al. |
| 6,944,168 B2 | 9/2005 | Paatela et al. |
| 6,978,223 B2 | 12/2005 | Milliken |
| 6,981,054 B1 | 12/2005 | Krishna |
| 7,058,735 B2 | 6/2006 | Spencer |
| 7,065,482 B2 | 6/2006 | Shorey et al. |
| 7,093,023 B2 | 8/2006 | Lockwood et al. |
| 7,117,280 B2 | 10/2006 | Vasudevan |
| 7,130,913 B2 | 10/2006 | Fallon |
| 7,139,743 B2 | 11/2006 | Indeck et al. |
| 7,181,437 B2 | 2/2007 | Indeck et al. |
| 7,191,233 B2 | 3/2007 | Miller |
| 7,321,937 B2 | 1/2008 | Fallon |
| 7,372,875 B2 | 5/2008 | Hadzic et al. |
| 7,376,755 B2 | 5/2008 | Pandya |
| 7,386,046 B2 | 6/2008 | Fallon et al. |
| 7,415,723 B2 | 8/2008 | Pandya |
| 7,417,568 B2 | 8/2008 | Fallon et al. |
| 7,420,931 B2 | 9/2008 | Nanda et al. |
| 7,480,253 B1 | 1/2009 | Allan |
| 7,487,264 B2 | 2/2009 | Pandya |
| 7,496,108 B2 | 2/2009 | Biran et al. |
| 7,536,462 B2 | 5/2009 | Pandya |
| 7,617,291 B2 | 11/2009 | Fan et al. |
| 7,627,693 B2 | 12/2009 | Pandya |
| 7,631,107 B2 | 12/2009 | Pandya |
| 7,636,703 B2 | 12/2009 | Taylor |
| 7,685,254 B2 | 3/2010 | Pandya |
| 7,827,190 B2 | 11/2010 | Pandya |
| 7,831,606 B2 | 11/2010 | Pandya |
| 7,831,607 B2 | 11/2010 | Pandya |
| 7,840,482 B2 | 11/2010 | Singla et al. |
| 7,856,545 B2 | 12/2010 | Casselman |
| 7,856,546 B2 | 12/2010 | Casselman et al. |
| 7,870,217 B2 | 1/2011 | Pandya |
| 7,890,692 B2 | 2/2011 | Pandya |
| 7,899,976 B2 | 3/2011 | Pandya |
| 7,899,977 B2 | 3/2011 | Pandya |
| 7,899,978 B2 | 3/2011 | Pandya |
| 7,912,808 B2 | 3/2011 | Pandya |
| 7,917,299 B2 | 3/2011 | Buhler et al. |
| 7,921,046 B2 | 4/2011 | Parsons et al. |
| 7,944,920 B2 | 5/2011 | Pandya |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,996,348 B2 | 8/2011 | Pandya |
| 8,005,966 B2 | 8/2011 | Pandya |
| 8,051,022 B2 | 11/2011 | Pandya |
| 8,055,601 B2 | 11/2011 | Pandya |
| 8,069,102 B2 | 11/2011 | Indeck et al. |
| 8,095,508 B2 | 1/2012 | Chamberlain et al. |
| 8,131,697 B2 | 3/2012 | Indeck et al. |
| 8,156,101 B2 | 4/2012 | Indeck et al. |
| 8,181,239 B2 | 5/2012 | Pandya |
| 8,200,599 B2 | 6/2012 | Pandya |
| 8,326,819 B2 | 12/2012 | Indeck et al. |
| 8,374,986 B2 | 2/2013 | Indeck et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,595,104 B2 | 11/2013 | Parsons et al. |
| 8,600,856 B2 | 12/2013 | Parsons et al. |
| 8,601,086 B2 | 12/2013 | Pandya |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 8,737,606 B2 | 5/2014 | Taylor et al. |
| 8,751,452 B2 | 6/2014 | Chamberlain et al. |
| 8,762,249 B2 | 6/2014 | Taylor et al. |
| 8,768,805 B2 | 7/2014 | Taylor et al. |
| 8,768,888 B2 | 7/2014 | Chamberlain et al. |
| 8,843,408 B2 | 9/2014 | Singla et al. |
| 8,879,727 B2 | 11/2014 | Taylor et al. |
| 8,880,501 B2 | 11/2014 | Indeck et al. |
| 2001/0052038 A1 | 12/2001 | Fallon et al. |
| 2001/0056547 A1 | 12/2001 | Dixon |
| 2002/0019812 A1 | 2/2002 | Board et al. |
| 2002/0031125 A1 | 3/2002 | Sato |
| 2002/0049841 A1* | 4/2002 | Johnson et al. ............... 709/225 |
| 2002/0069370 A1 | 6/2002 | Mack |
| 2002/0069375 A1 | 6/2002 | Bowen |
| 2002/0080871 A1 | 6/2002 | Fallon et al. |
| 2002/0091826 A1* | 7/2002 | Comeau et al. ............... 709/226 |
| 2002/0095512 A1 | 7/2002 | Rana et al. |
| 2002/0101425 A1 | 8/2002 | Hamid |
| 2003/0014521 A1 | 1/2003 | Elson et al. |
| 2003/0018630 A1 | 1/2003 | Indeck et al. |
| 2003/0037037 A1 | 2/2003 | Adams et al. |
| 2003/0041129 A1 | 2/2003 | Appleby-Allis |
| 2003/0078865 A1 | 4/2003 | Lee |
| 2003/0097481 A1 | 5/2003 | Richter |
| 2003/0099254 A1 | 5/2003 | Richter |
| 2003/0105721 A1 | 6/2003 | Ginter et al. |
| 2003/0120460 A1 | 6/2003 | Aubury |
| 2003/0121010 A1 | 6/2003 | Aubury |
| 2003/0140337 A1 | 7/2003 | Aubury |
| 2003/0154284 A1 | 8/2003 | Bernardin et al. |
| 2003/0177253 A1 | 9/2003 | Schuehler et al. |
| 2003/0191876 A1 | 10/2003 | Fallon |
| 2003/0221013 A1 | 11/2003 | Lockwood et al. |
| 2004/0010612 A1 | 1/2004 | Pandya |
| 2004/0015633 A1 | 1/2004 | Smith |
| 2004/0019703 A1 | 1/2004 | Burton |
| 2004/0028047 A1 | 2/2004 | Hou et al. |
| 2004/0049596 A1 | 3/2004 | Schuehler et al. |
| 2004/0054924 A1 | 3/2004 | Chuah et al. |
| 2004/0105458 A1 | 6/2004 | Ishizuka |
| 2004/0205149 A1 | 10/2004 | Dillon et al. |
| 2005/0044344 A1 | 2/2005 | Stevens |
| 2005/0108518 A1 | 5/2005 | Pandya |
| 2005/0243824 A1 | 11/2005 | Abbazia et al. |
| 2006/0020715 A1 | 1/2006 | Jungck |
| 2006/0039287 A1 | 2/2006 | Hasegawa et al. |
| 2006/0109798 A1 | 5/2006 | Yamada |
| 2006/0215691 A1 | 9/2006 | Kobayashi et al. |
| 2006/0294059 A1 | 12/2006 | Chamberlain et al. |
| 2007/0011317 A1 | 1/2007 | Brandyburg et al. |
| 2007/0011687 A1 | 1/2007 | Ilik et al. |
| 2007/0061594 A1 | 3/2007 | Ginter et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0118500 A1 | 5/2007 | Indeck et al. |
| 2007/0130140 A1 | 6/2007 | Cytron et al. |
| 2007/0174841 A1 | 7/2007 | Chamberlain et al. |
| 2007/0209068 A1 | 9/2007 | Ansari et al. |
| 2007/0237327 A1 | 10/2007 | Taylor et al. |
| 2007/0260602 A1 | 11/2007 | Taylor |

(56) References Cited

U.S. PATENT DOCUMENTS

| | | | |
|---|---|---|---|
| 2007/0277036 A1 | 11/2007 | Chamberlain et al. | |
| 2007/0294157 A1 | 12/2007 | Singla et al. | |
| 2008/0086274 A1 | 4/2008 | Chamberlain et al. | |
| 2008/0109413 A1 | 5/2008 | Indeck et al. | |
| 2008/0114724 A1 | 5/2008 | Indeck et al. | |
| 2008/0114725 A1 | 5/2008 | Indeck et al. | |
| 2008/0114760 A1 | 5/2008 | Indeck et al. | |
| 2008/0126320 A1 | 5/2008 | Indeck et al. | |
| 2008/0133453 A1 | 6/2008 | Indeck et al. | |
| 2008/0133519 A1 | 6/2008 | Indeck et al. | |
| 2008/0175239 A1 | 7/2008 | Sistanizadeh et al. | |
| 2008/0243675 A1 | 10/2008 | Parsons et al. | |
| 2008/0253395 A1 | 10/2008 | Pandya | |
| 2009/0182683 A1 | 7/2009 | Taylor et al. | |
| 2009/0262741 A1 | 10/2009 | Jungck et al. | |
| 2009/0287628 A1 | 11/2009 | Indeck et al. | |
| 2010/0174770 A1 | 7/2010 | Pandya | |
| 2010/0198920 A1* | 8/2010 | Wong et al. | 709/206 |
| 2011/0040701 A1 | 2/2011 | Singla et al. | |
| 2011/0066832 A1 | 3/2011 | Casselman et al. | |
| 2011/0125960 A1 | 5/2011 | Casselman | |
| 2011/0178911 A1 | 7/2011 | Parsons et al. | |
| 2011/0178912 A1 | 7/2011 | Parsons et al. | |
| 2011/0178917 A1 | 7/2011 | Parsons et al. | |
| 2011/0178918 A1 | 7/2011 | Parsons et al. | |
| 2011/0178919 A1 | 7/2011 | Parsons et al. | |
| 2011/0178957 A1 | 7/2011 | Parsons et al. | |
| 2011/0179050 A1 | 7/2011 | Parsons et al. | |
| 2011/0184844 A1 | 7/2011 | Parsons et al. | |
| 2011/0199243 A1 | 8/2011 | Fallon et al. | |
| 2011/0231446 A1 | 9/2011 | Buhler et al. | |
| 2011/0252008 A1 | 10/2011 | Chamberlain et al. | |
| 2011/0295967 A1 | 12/2011 | Wang et al. | |
| 2012/0089496 A1 | 4/2012 | Taylor et al. | |
| 2012/0089497 A1 | 4/2012 | Taylor et al. | |
| 2012/0095893 A1 | 4/2012 | Taylor et al. | |
| 2012/0109849 A1 | 5/2012 | Chamberlain et al. | |
| 2012/0110316 A1 | 5/2012 | Chamberlain et al. | |
| 2012/0116998 A1 | 5/2012 | Indeck et al. | |
| 2012/0117610 A1 | 5/2012 | Pandya | |
| 2012/0130922 A1 | 5/2012 | Indeck et al. | |
| 2012/0215801 A1 | 8/2012 | Indeck et al. | |
| 2012/0246052 A1 | 9/2012 | Taylor et al. | |
| 2013/0018835 A1 | 1/2013 | Pandya | |
| 2013/0086096 A1 | 4/2013 | Indeck et al. | |
| 2013/0151458 A1 | 6/2013 | Indeck et al. | |
| 2013/0262287 A1 | 10/2013 | Parsons et al. | |
| 2013/0290163 A1 | 10/2013 | Parsons et al. | |
| 2014/0025656 A1 | 1/2014 | Indeck et al. | |
| 2014/0040109 A1 | 1/2014 | Sugimoto et al. | |
| 2014/0067830 A1 | 3/2014 | Buhler et al. | |
| 2014/0089163 A1 | 3/2014 | Parsons et al. | |
| 2014/0164215 A1 | 6/2014 | Parsons et al. | |
| 2014/0180903 A1 | 6/2014 | Parsons et al. | |
| 2014/0180904 A1 | 6/2014 | Parsons et al. | |
| 2014/0180905 A1 | 6/2014 | Parsons et al. | |
| 2014/0181133 A1 | 6/2014 | Parsons et al. | |
| 2014/0310148 A1 | 10/2014 | Taylor et al. | |
| 2014/0310717 A1 | 10/2014 | Chamberlain et al. | |

FOREIGN PATENT DOCUMENTS

| | | |
|---|---|---|
| WO | 2001080558 | 10/2001 |
| WO | 2003104943 A2 | 12/2003 |
| WO | 2004042560 A | 5/2004 |
| WO | 2004042561 A | 5/2004 |
| WO | 2004042562 | 5/2004 |
| WO | 2004042574 A | 5/2004 |
| WO | 2005081855 A2 | 9/2005 |
| WO | 2005114339 A2 | 12/2005 |
| WO | 2006060571 A2 | 6/2006 |
| WO | 2007079095 A2 | 7/2007 |
| WO | 2008073824 A1 | 6/2008 |
| WO | 20101077829 | 7/2010 |
| WO | 2013090363 A2 | 6/2013 |

OTHER PUBLICATIONS

Batory, "Modeling the Storage Architectures of Commercial Database Systems", ACM Transactions on Database Systems, Dec. 1985, pp. 463-528, vol. 10, issue 4.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Chamberlain et al., "The Mercury System: Embedding Computation Into Disk Drives", 7th High Performance Embedded Computing Workshop, Sep. 2003, Boston, MA.

Chamberlain et al., "The Mercury System: Exploiting Truly Fast Hardware for Data Search", Proc. of Workshop on Storage Network Architecture and Parallel I/Os, Sep. 2003, New Orleans, LA.

Chaney et al., "Design of a Gigabit ATM Switch", Washington University, St. Louis.

Choi et al., "Design of a Flexible Open Platform for High Performance Active Networks", Allerton Conference, 1999, Champaign, IL.

Compton et al., "Configurable Computing: A Survey of Systems and Software", Technical Report, Northwestern University, Dept. Of ECE, 1999.

Compton et al., "Reconfigurable Computing: A Survey of Systems and Software", Technical Report, Northwestern University, Dept. Of ECE, 1999, presented by Yi-Gang Tai.

Compton et al., "Reconfigurable Computing: A Survey of Systems and Software", University of Washington, ACM Computing Surveys, Jun. 2, 2002, pp. 171-210, vol. 34 No. 2, <http://www.idi.ntnu.no/emner/tdt22/2011/reconfig.pdf>.

Ebeling et al., "RaPiD—Reconfigurable Pipelined Datapath", University of Washington, Dept. of Computer Science and Engineering, Sep. 23, 1996, Seattle, WA.

Gokhale et al., "Reconfigurable Computing: Accelerating Computation with Field-Programmable Gate Arrays", Springer, 2005, pp. 1-36.

Gokhale et al., "Reconfigurable Computing: Accelerating Computation With Field-Programmable Gate Arrays", 2005, pp. 1-3, 7, 11-15, 39, 92-93, Springer.

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Mao et al., "Cluster-based Online Monitoring System of Web Traffic", Dept. of Computer Science and Technology, Tsinghua Univ., Bejing, 100084 P.R. China.

Necker et al., "TCP-Stream Reassembly and State Tracking in Hardware", School of Electrical and Computer Engineering, Georgia Institute of Technology, Atlanta, GA.

Ratha et al., "Convolution on Splash 2", Proceedings of IEEE Symposium on FPGAS for Custom Computing Machines, Apr. 19, 1995, pp. 204-213, Los Alamitos, California.

Roy, "A bounded search algorithm for segmented channel routing for FPGA's and associated channel architecture issues", IEEE, Nov. 11, 1993, pp. 1695-1705, vol. 12.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc. gatech.edu/classes/AY2007/cs8803hpc_fall/papers/phplugins.pdf.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Yoshitani et al., "Performance Evaluation of Parallel Volume Rendering Machine Re Volver/C40", Study Report of Information Processing Society, Mar. 5, 1999, pp. 79-84, vol. 99, No. 21.

* cited by examiner

METHOD AND APPARATUS FOR LOW LATENCY DATA DISTRIBUTION

CROSS REFERENCE AND PRIORITY CLAIM TO RELATED PATENT APPLICATIONS

This patent application claims priority to U.S. Pat. App. Ser. No. 61/570,670, filed Dec. 14, 2011, entitled "Method and Apparatus for Low Latency Data Distribution", the entire disclosure of which is incorporated herein by reference.

This patent application is related to U.S. Pat. Nos. 7,840,482, 7,921,046, and 7,954,114 as well as the following published patent applications: U.S. Pat. App. Pub. 2007/0174841, U.S. Pat. App. Pub. 2007/0294157, U.S. Pat. App. Pub. 2008/0243675, U.S. Pat. App. Pub. 2009/0182683, U.S. Pat. App. Pub. 2009/0287628, U.S. Pat. App. Pub. 2011/0040701, U.S. Pat. App. Pub. 2011/0178911, U.S. Pat. App. Pub. 2011/0178912, U.S. Pat. App. Pub. 2011/0178917, U.S. Pat. App. Pub. 2011/0178918, U.S. Pat. App. Pub. 2011/0178919, U.S. Pat. App. Pub. 2011/0178957, U.S. Pat. App. Pub. 2011/0179050, U.S. Pat. App. Pub. 2011/0184844, WO Pub. WO 2010/077829, and U.S. patent application Ser. No. 13/316,332, entitled "Method and Apparatus for Managing Orders in Financial Markets", filed Dec. 9, 2011, and published as U.S. Pat. App. Pub. 2012/0246052, the entire disclosures of each of which are incorporated herein by reference.

INTRODUCTION

Distributing large volumes of data is a key challenge for computing and information systems of any appreciable scale. The exemplary embodiments of the invention disclosed herein apply to a vast spectrum of applications that would benefit from low-latency delivery of large volumes of data to multiple data consumers. These embodiments fundamentally address the practical problems of distributing such data over bandwidth-limited communication channels to compute-limited data consumers. This problem is particularly acute in connection with real-time data. Real-time data distribution systems must contend with these physical limits when the real-time data rates exceed the ability of the communication channel to transfer the data and/or the ability of the data consumers to consume the data. Furthermore, the distribution of real-time financial market data to applications such as trading, risk monitoring, order routing, and matching engines represents one of the most demanding contemporary use cases. While many of the exemplary embodiments discussed herein focus on applications in the financial markets, it should be understood that the technology described herein may be applied to a wide variety of other application domains.

Many underlying technologies exist for computer communications. An exemplary list of computer communication channels is as follows: processor to processor interconnects, shared registers, shared memory, on-chip buses, system buses, "memory fabric" networks, frame-based networks, packet-based networks, etc. We refer to a task as an application or component of an application that may produce or consume data. For example, a task running on one processor core may communicate with a task running on another processor core on the same die (chip) via a direct physical interconnection between the processor cores. Similarly, a task running on one processor core may communicate with a task running on another processor core in a different computing system via a frame-based network. The invention described herein can leverage a wide variety of computer communication channels.

Traditional communication protocols are built on the idea of sending messages (cells, frames, or packets) from one task to another. Typically, messages are transferred from an output queue of the producing task to an input queue of the consuming task. This style of communication protocol is effective for event-based data distribution, where receipt of every real-time event is required by the consuming applications. Note that this style of communication protocol requires the data producer to transmit every message and it requires data consumers to receive and process every message. Message-based protocols may provide features such as inter-network routing and multicast. Inter-network routing allows messages to traverse disparate networks in order to reach data consumers. Multicast allows data producers to transmit one copy of a message that is distributed to multiple consumers. Replication of the message is performed by network infrastructure as the message transits the network. Note that various protocols also provide features to contend with physical constraints such as finite link bandwidth or finite processing resources for data producers and consumers. When these physical limits are reached, protocols typically choose to delay the messages (by queuing at the producer and/or consumer), drop the messages (and optionally retry the transfer), or summarize the pending messages into a smaller number of messages to reduce the resources required to perform the transfer.

The latter option, also known as conflation, has a number of benefits for applications that can tolerate this message consolidation. Firstly, it reduces the number of messages that must be transferred. Secondly, it has the ability to deliver more quickly the most current data to the consumer. Consider a queue containing multiple messages with the current price for a financial instrument. The message at the tail of the queue represents the most current price. If all the messages in the queue must be transferred across the communication channel and processed by the consumer, then significant resources (bandwidth and processing cycles) are consumed prior to the consumer receiving the most current price for the financial instrument. It is important to note that in many application domains, some data items are amenable to conflation (such as the most current price) while other data items are not (such as a trade cancellation notice).

Conventional financial market data delivery systems utilize protocols or "messaging systems" that typically include feedback loops that exist between the producer of a data stream and the immediate consumers of that data stream. This feedback loop is required by the producer so it can adjust its outward flow rate to match that of each consumer. The flow adjustment is needed so that no essential update events (that represent state transitions, trade reports, etc.) are lost between producer and consumer by overrunning the consumer, with the end result that data received and maintained by the consuming systems is always in a consistent and coherent state. Legacy market data platforms typically use both unicast and multicast communication protocols between producer and consumer components.

The term "financial market data" as used herein refers to data contained in or derived from a series of messages that individually represent a new offer to buy or sell a financial instrument, an indication of a completed sale of a financial instrument, notifications of corrections to previously-reported sales of a financial instrument, administrative messages related to such transactions, and the like. Feeds of messages which contain financial market data are available from a number of sources and exist in a variety of feed types—for example, Level 1 feeds and Level 2 feeds. Furthermore, as used herein, a "financial instrument" refers to a contract representing an equity ownership, debt, or credit, typically in relation to a corporate or governmental entity, wherein the contract is saleable. Examples of financial instruments include stocks, bonds, options, commodities, currency traded on currency markets, etc. but would not include cash or checks in the sense of how those items are used outside the financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein).

Multicast communication protocols are able to deliver an event to multiple receivers simultaneously, but also have negative characteristics. A producer must not transmit data at a rate higher than the slowest consumer, otherwise "re-transmission storms" can result that impact all consumers. Part of the aforementioned feedback loop is often a configuration setting in the producer to limit the data flow rate to a value determined empirically by monitoring the consumption rate of a group of consuming applications. Furthermore, even though events are delivered simultaneously to multiple consumers, it comes at a cost of imposing extra work on each consumer. Increasing the subscription load of one consumer places an extra burden on every other consumer as they are forced to filter additional, unwanted transactions from the multicast stream.

Unicast communication protocols have characteristics that move this extra processing overhead burden from consumer to producer. Each consumer receives events for only the financial instruments for which it has expressed an interest with the producer, minimizing the computational overhead induced on each consumer. However, a producer must send an independent copy of a particular transaction event to each consumer that has registered interest in that item, imposing an extra burden on the producer and increasing the network bandwidth needed to carry the aggregated traffic. Furthermore, the unicast communication protocol (such as TCP) provides a direct feedback mechanism between consumer and producer, allowing the producer to limit the data flow rate so as to not overrun the consumer. But this can place an additional processing burden on the producer to manage the event buffers and traffic flow independently for each consumer.

Another style of communication protocol is Direct Memory Access (DMA). Instead of sending messages (frames or packets) between data producers and consumers, data may be accessed directly from the physical memory of the data producer or transferred directly to the physical memory of the data consumer. In a DMA "read" operation, the consumer reads data directly from a memory region in the producer. Note that it is possible for this read operation to be performed without participation (and thus processing resources consumed) by the producer. Similarly in a DMA "write" operation, the producer writes data directly to a memory region in the consumer. It is also possible for this write operation to be performed without participation (and thus processing resources consumed) by the consumer. This allows the data producer to transmit data at a maximum rate (required to minimize overall data latency) that is irrespective of the rate at which the consuming systems are able to process incoming messages. The data flow rate of the producer is effectively decoupled from the data flow rate of the consumer. Note that DMA transfers may occur "locally" between producers and consumers within the same system, LDMA. DMA transfers may also occur "remotely" between producers and consumers in disparate systems, RDMA.

While the transfer of data from memory region to memory region is enabled by DMA protocols, ensuring that the transaction is complete and the data is coherent is left to upper-layer protocols or the application. DMA protocols typically ensure that read/write transactions to the same addressable memory location do not collide. For example, a data producer may be writing to memory location 0x2983 in its memory region while a data consumer is attempting a DMA read transaction to memory location 0x2983. The DMA protocol typically specifies how these cases are handled, e.g. the read is blocked until the write completes then the read is allowed. In many applications, an atomic unit of data such as a record for a financial instrument spans multiple addressable memory locations. For example, memory may be long-word (64-bit) addressable, but the atomic unit of data for an application may be 256 bytes, typically stored in 32 contiguous memory locations.

It is also important to note that when an application issues a read or write transaction for an atomic unit of data that spans multiple memory locations, the underlying memory subsystem in modern computing systems may fragment and re-order the transactions to individual physical memory locations. This is of particular concern in multi-processor systems that utilize Non-Uniform Memory Access (NUMA) architectures. For example, if an application issues a read transaction for 256 bytes of data starting at memory location 0x0100, the underlying memory subsystem may fragment and re-order the transaction into the following read transactions: read 128 bytes @ 0x0110, read 64 bytes @ 0x100, then read 64 bytes @ 0x0108. A higher layer protocol or the application must ensure that the data retrieved from a DMA read transaction represents a coherent view of the atomic unit of data.

A characteristic of conventional market data distribution systems is a layered architecture used to achieve wider scale distribution. A number of data producers residing in a first layer of the architecture publish one or more data streams using a multicast or unicast communication protocol that are received by components within an intermediate layer of the architecture. The intermediate layer components in turn publish data streams using the same or different communication protocol to another layer of the architecture, and so on, with end-consumer applications forming the final layer of the architecture.

The use of RDMA read communication protocols for the transfer of real-time financial market data has recently emerged. Utilization of DMA read techniques represents an improvement over prior state of the art by eliminating the extra processing burden placed on consumers arising from the consumers' use of multicast communication protocols, as well as the extra processing burden placed on producers that use unicast communication protocols. In a proto-typical market data platform, feed handler components are hosted on a set of disparate computing systems (typically enterprise-class servers). A given feed handler component maintains a normalized record for each financial instrument for which it receives an update. This set of records may be stored or copied to a memory region that consuming applications may read via RDMA read transactions. Typically, this requires that consuming applications continuously issue read transactions in order to determine if new data is available, also known as "polling" or a "memory pull" paradigm. In addition to the potential waste of bandwidth and processing resources, the memory pull paradigm adds latency to the delivery of data to the consumer by introducing a round-trip delay across the RDMA transport channel.

Existing systems that utilize unicast, multicast, conflation, and/or DMA read protocols typically implement them in software running on traditional general-purpose processors that function as the main CPUs of the system servers (although multi-threaded implementations that separate processing from transmit/receive functions are common). This arrangement increases the overhead in terms of processing resources (that could otherwise be used for applications), time (added latency in data transfers), space and power.

Against this background, it is desirable for new technology to further reduce latency, increase scale (wide distribution), and reduce the utilization of compute resources (so these computer resources can be freed for devotion to other tasks).

Exemplary embodiments of the invention described herein include mechanisms that provide for the construction of real-time data distribution systems that meet any or all of following goals, or any combination thereof:
1. Reduced data latency
2. Scalability for large numbers of data consumers
3. Reduced power consumption
4. Reduced space consumption
5. Reduced management complexity and cost
6. Well-defined component interfaces
7. Independent deployment of components

DETAILED DESCRIPTION

Figure 1:
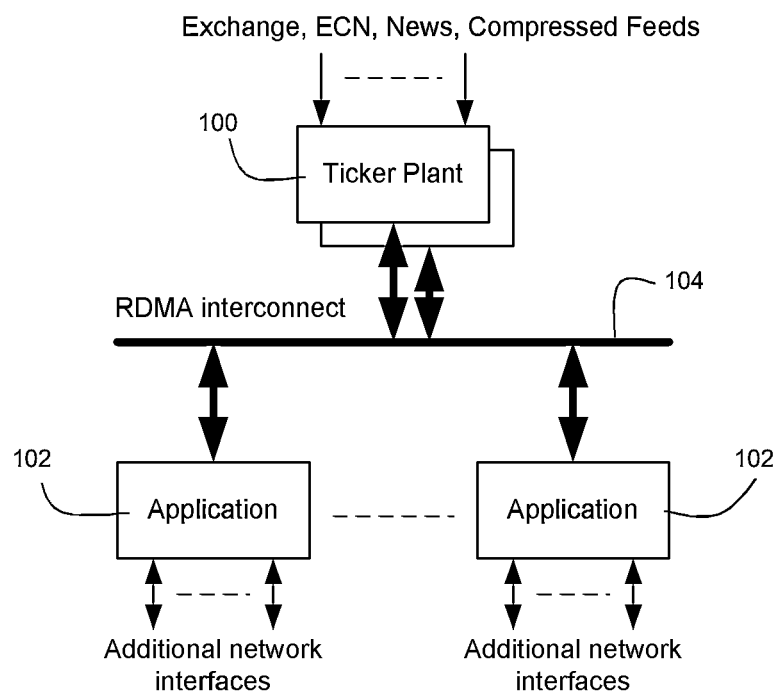
FIG. 1 depicts an exemplary direct connect distribution architecture.

FIG. 1 shows a diagram of a "direct connection" distribution architecture for financial market data distribution. In this exemplary figure, the ticker plant 100 is the data producer, distributing normalized, enriched, and filtered market data to subscribing applications 102.

Exemplary technology that can be employed for such a ticker plant 100 can be found in U.S. Pat. Nos. 7,921,046 and 7,840,482, the following published patent applications: U.S. Pat. App. Pub. 2009/0182683, U.S. Pat. App. Pub. 2011/0040701, U.S. Pat. App. Pub. 2011/0178911, U.S. Pat. App. Pub. 2011/0178912, U.S. Pat. App. Pub. 2011/0178917, U.S. Pat. App. Pub. 2011/0178918, U.S. Pat. App. Pub. 2011/0178919, U.S. Pat. App. Pub. 2011/0178957, U.S. Pat. App. Pub. 2011/0179050, U.S. Pat. App. Pub. 2011/0184844, and WO Pub. WO 2010/077829, and U.S. patent application Ser. No. 13/316,332, entitled "Method and Apparatus for Managing Orders in Financial Markets", filed Dec. 9, 2011, and published as U.S. Pat. App. Pub. 2012/0246052, the entire disclosures of each of which are incorporated herein by reference. Typically, one or more client applications 102 are hosted on a host (e.g., a computer system with one or more processors, associated memory, network interfaces, etc.). In this example, the client hosts and the ticker plant are equipped with interface adapters to an RDMA capable interconnect 104 (e.g. InfiniBand fabric, Ethernet network, or cabled PCI Express bus). As described in the above-referenced and incorporated patents and patent applications, client applications typically gain access to data via an application programming interface (API).

Client applications 102 may retrieve static snapshots of current data for financial instruments or current derived views of data for financial instruments from the ticker plant 100. In this use case, the API issues DMA read requests to the ticker plant for the record of interest. As described in the Introduction, this distribution model of clients issuing DMA read requests is suitable when latency is not critical, the client host has sufficient compute resources to issue read requests, and the ticker plant and RDMA interconnect 104 is capable of servicing the aggregate rate of read requests from all connected clients.

Clients may also subscribe to continuous real-time updates of current data (or derived views) for financial instruments. In this use case, the API issues subscription requests to the ticker plant for the instruments and/or derived views of interest. The ticker plant responds with delivery of the current view of the instrument and real-time delivery of subsequent real-time updates. Subsequent sections describe methods for distributing multiple-classes of real-time data updates via DMA interconnects to data consumers. In preview, the ticker plant can write updates directly to shared memory in the client host. The means of transfer depends upon the class of data (critical, adaptive, or metered) and the presence of congestion on the DMA interconnect. We also describe multi-class data delivery via traditional message-based interconnects.

Note that the physical components in the interconnection network—the adapter in the ticker plant, interconnect media (e.g. cables), interconnect switches, and adapters in the client hosts—place practical constraints on the number of transfers per second that can be distributed from the ticker plant to client applications. This aggregate publishing rate is be shared among the set of connected applications when using unicast (point-to-point) distribution. The ticker plant can transmit a unique copy of each update to each interested application. (Note that we describe multicast distribution via DMA in a subsequent section.) The ticker plant also has a finite limit on the number of client connections it can maintain due to the per-connection state that must be maintained. These and other physical constraints limit the maximum number of client connections that can be supported in a "direct connection" architecture.

Figure 2:
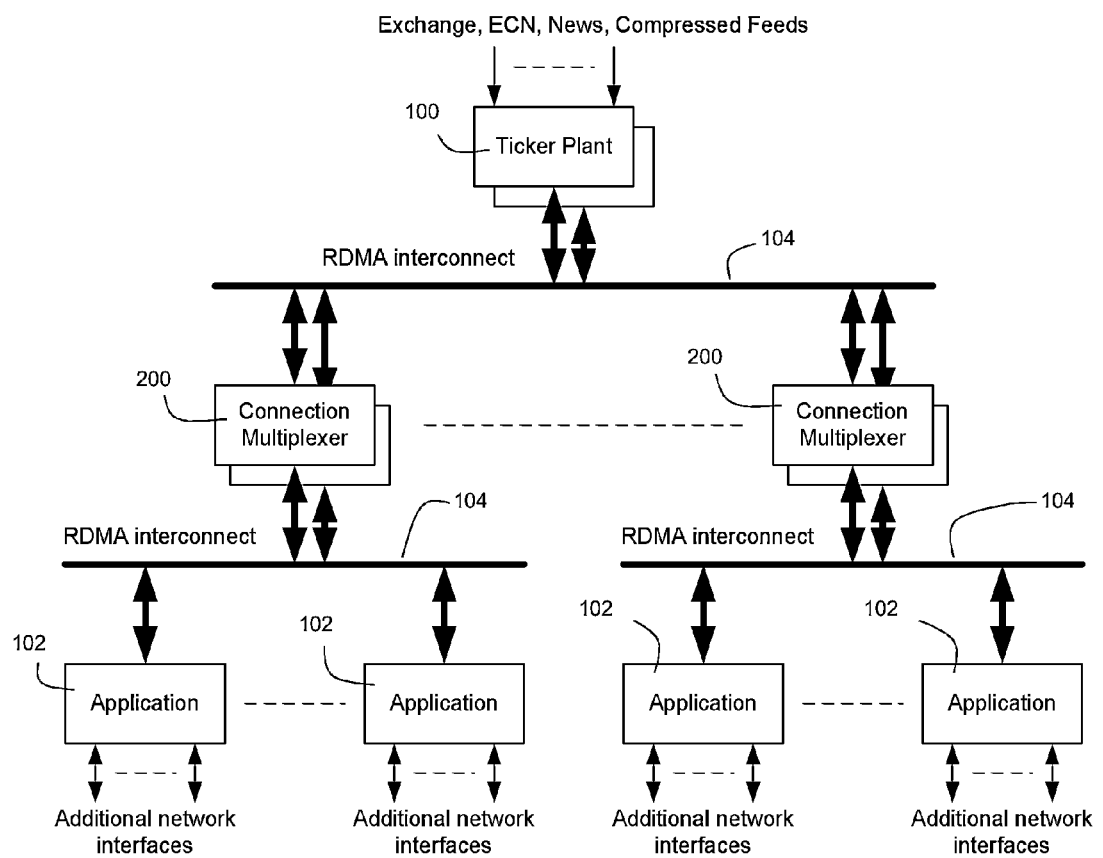
FIG. 2 depicts an exemplary RDMA distribution architecture with connection multiplexers.

FIG. 2 shows a diagram of an exemplary inventive multi-tier architecture for real-time data distribution via DMA interconnect. Connection multiplexers 200 effectively multiplex multiple downstream application connections into a single upstream "connection". This allows the number of applications 102 that may be reached via DMA interconnect to be dramatically increased. The connection multiplexer 200 establishes a single connection to the ticker plant 100. The connection semantics are identical to a "direct connection" application. The connection multiplexer 200 provides the same connection semantics as the ticker plant 100 to downstream clients (either client applications 102 or connection multiplexers 200). Note that this architecture removes the physical constraints limiting the number of serviceable client applications 102. The number of DMA interconnects increases. For example, assume that a single instance of a DMA interconnect can support 40 client applications. By utilizing a multi-tier architecture with connection multiplexers, multiple discrete DMA interconnects can be used. Similarly, the amount of replication performed by the ticker plant for unicast delivery is significantly reduced.

Figure 3:
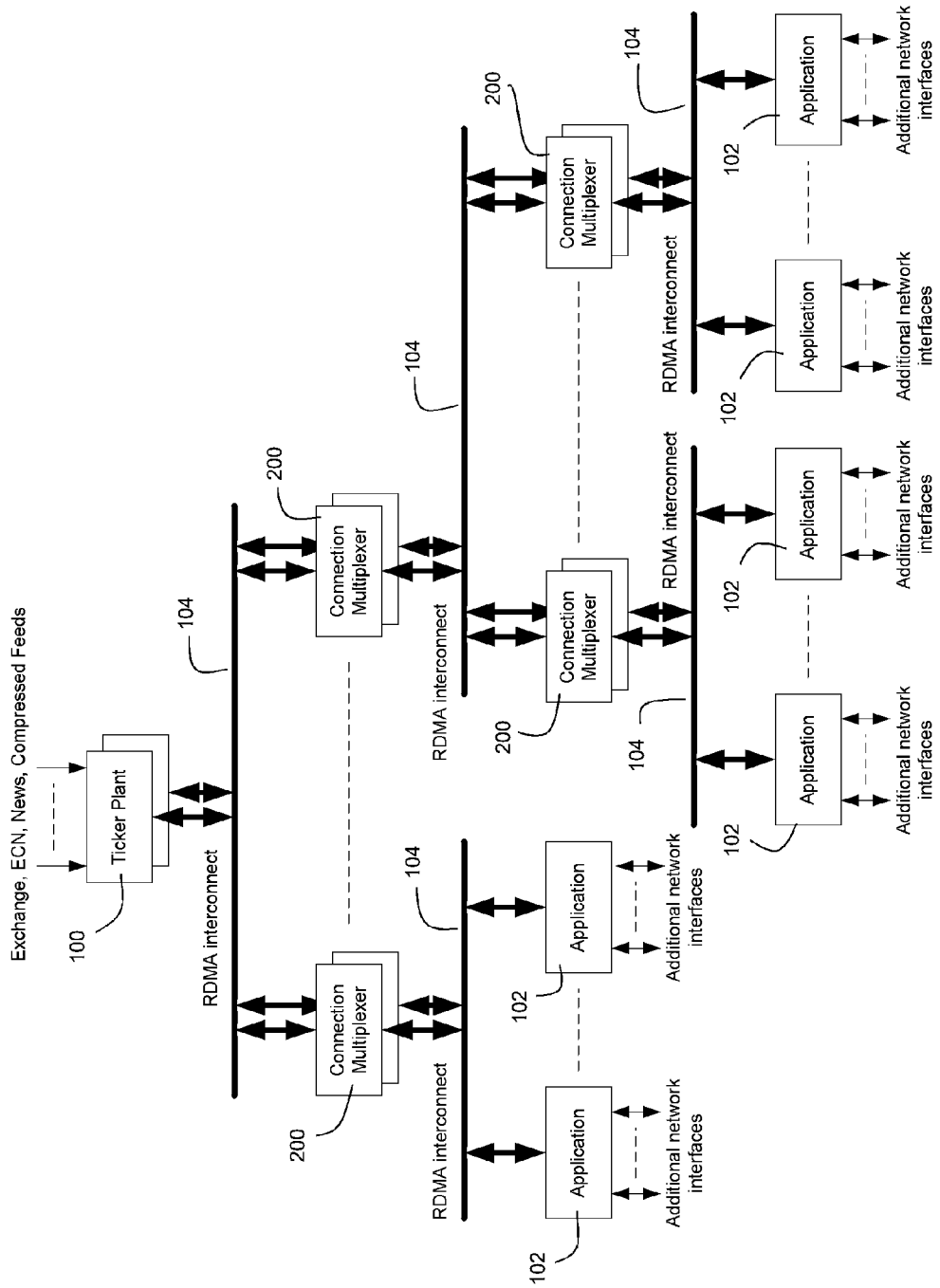
FIG. 3 depicts an exemplary multi-tier RDMA distribution architecture with connection multiplexers.

FIG. 3 shows a diagram of an exemplary multi-tier architecture for real-time data distribution via DMA interconnect that utilizes multiple tiers of connection multiplexers 200 to increase the number of connected client applications 102.

During connection establishment, user authentication and entitlement checks may be performed. In one embodiment, the connection multiplexer 200 forwards application login credentials to the root ticker plant 100. The root ticker plant 100 authenticates the client and looks up the client's entitlements, a specification of what data items the client is allowed to request. The ticker plant responds to the connection multiplexer with a login rejected response or a login accepted response with accompanying listing of entitlements for the client application. The connection multiplexer maintains a record of the client's entitlements to reference when subsequent data requests/subscriptions are received from the client. In another embodiment, the set of client entitlements is maintained exclusively on the ticker plant 100 and all requests for new data items are forwarded to the ticker plant for entitlement checks. In yet another embodiment, the connection multiplexer 200 performs the client authentication and entitlement checking. The connection multiplexer 200 is provided access to the database of user credentials and associated entitlements. Note that this may be downloaded from the ticker plant 100 when the connection multiplexer establishes its connection to the ticker plant. In both embodiments, the ticker plant may interface to an entitlement system that stores and manages the username/password/entitlements relationships.

The connection multiplexer 200 can maintain a cache that represents the aggregate set of subscribed items for all connected applications. When real-time updates are received from the ticker plant, the associated record in the connection multiplexer cache is updated and the real-time update is propagated to subscribed applications via the downstream DMA interconnect. When applications connected to the connection multiplexer request a new data item, the connection multiplexer checks to see if the client is entitled to access the data item. This entitlement check may be performed in the connection multiplexer or forwarded to the ticker plant, per the aforementioned embodiments. If the client is entitled to access the data item, the connection multiplexer checks to see if another connected application has an existing subscription to the real-time data item. If an existing subscription exists, then the connection multiplexer generates an initial refresh image of the data item and transmits it to the client application. The connection multiplexer also adds the client application to the list of subscribers for the data item. Note that an "interest list" is maintained with each data item record in the connection multiplexer cache. If the application is the first to request a given data item, the connection multiplexer forwards the request upstream. When the initial refresh for the data item is received, it is stored in the connection multiplexer cache. The requesting application is added to the list of subscribers, and the refresh is transmitted to the requesting application. The application now receives all subsequent real-time updates for the data item, along with the other subscribed applications.

Figure 4:
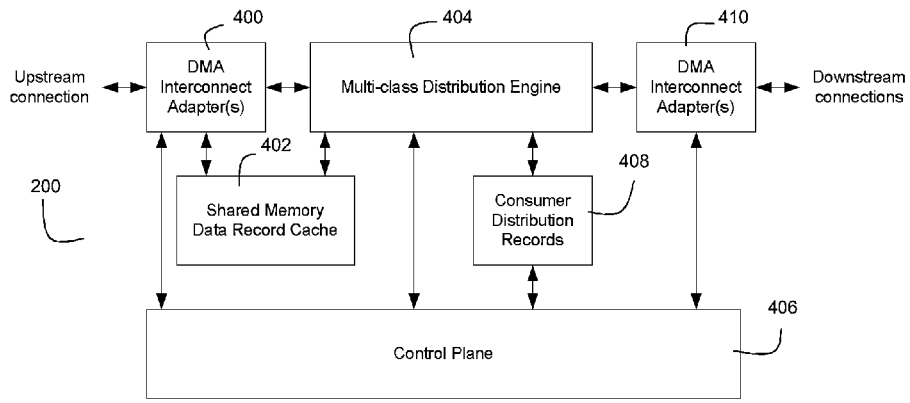
FIG. 4 depicts an exemplary connection multiplexer.

A block diagram of an exemplary connection multiplexer 200 is shown in FIG. 4. One or more DMA interconnect adapters 400 ingest data from an upstream source, either a ticker plant or connection multiplexer. Input data is directly written to shared memory 402 in the connection multiplexer. In one embodiment, the input data written to the shared memory is in the same format as the data to be distributed to downstream clients. In this embodiment, the shared memory region can also serve as the record cache for the connection multiplexer. The Multi-Class Distribution Engine (MDE) 404 is responsible for:

1. Receiving notifications of updates to the shared memory data record cache from the input DMA interconnect adapter(s)
2. Retrieving data associated with updates and performing any necessary coherency checks prior to transmission
3. Transmitting data to subscribed downstream consumers based on the class of data and per-consumer connection state.

Rules governing the classification of data may be optionally configured via the Control Plane 406. Per-consumer connection state is maintained in the Consumer Distribution Records (CDR) 408. The functionality of the MDE is described in subsequent sections. The information stored in the CDR is also described in subsequent sections. In the preferred embodiment of the connection multiplexer, the MDE supports the Critical and Adaptive classes of data transmission via Direct Memory Access (DMA) interconnect. In general, eliminating support for unused (or underused) classes of data transmission (such as the Metered class) can lead to a more efficient implementation of the connection multiplexor.

The control plane 406 is responsible for the following:
1. Configuring the various datapath components; this includes configuring the data classification rules and transmission parameters for the Multi-Class Distribution Engine
2. Reading status and statistics values from each component; reporting status and statistics to local/remote log files and external monitoring applications
3. Performing connection and subscription processing as previously subscribed The connection multiplexer may be implemented in a variety of ways. It may be implemented using standard interconnect adapters, general-purpose processors (GPPs), and software. Higher capacity and lower latency may be achieved by employing chip-multi-processors (CMPs), graphics processors (GPUs), and/or reconfigurable logic.

As used herein, the term "general-purpose processor" (or GPP) refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor. As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture. Furthermore, as used herein, the term "software" refers to data processing functionality that is deployed on a GPP or other processing devices, wherein software cannot be used to change or define the form of the device on which it is loaded, while the term "firmware", as used herein, refers to data processing functionality that is deployed on reconfigurable logic or other processing devices, wherein firmware may be used to change or define the form of the device on which it is loaded.

Thus, in embodiments where one or more components of the connection multiplexer is implemented in reconfigurable logic such as an FPGA, hardware logic will be present on the device that permits fine-grained parallelism with respect to the different operations that such components perform, thereby providing such a component with the ability to operate at hardware processing speeds that are orders of magnitude faster than would be possible through software execution on a GPP.

In the preferred embodiment, the Multi-class Distribution Engine 404 is implemented in one or more reconfigurable logic device(s). Preferably, the reconfigurable logic device(s) have direct access to high-speed memory for the Shared Memory Data Record Cache and the Consumer Distribution Records. Preferably, direct access to the high-speed memory for the Shared Memory Data Record Cache is also provided to the upstream DMA adapter 400. Preferably, the upstream DMA adapter 400 communicates directly to the reconfigurable logic device(s) via a dedicated interconnect or high-speed system bus. Similarly, the reconfigurable logic device(s) communicate directly to the downstream DMA adapter 410 via a dedicated interconnect or high-speed system bus.

While the connection multiplexer provides a scalable, efficient, low-latency means of achieving wide distribution via Direct Memory Access (DMA) interconnections, there are a wide variety of applications that do not require the high-bandwidth, ultra-low-latency of DMA interconnects. Rather, these classes of applications seek to maximize scalability (i.e. the number of client connections) while minimizing deployment cost. These classes of applications typically include "legacy" applications that are brittle (difficult to change), low capacity, and latency insensitive (i.e. slow relative to contemporary data rates). A prime example of this class of application is financial market data "dashboard" applications that display real-time market data via a Graphical User Interface (GUI). Typically, once a large number of users learn to use an interface, the interface is difficult to change. Furthermore, the rate at which humans can observe changes in a graphic display is fixed (i.e. humans cannot perceive changes in the display if the rate of change is greater than 4 changes per second or so). Such classes of applications may prefer to receive a metered data transmission that insulates the applications from increases and fluctuations in real-time data rates. Furthermore, these classes of applications seek to achieve a high-level of efficiency and scalability, thus the desire to leverage common data processing infrastructure with the ability to distribute processed data to a large set of consumers over commodity message-based interconnection networks (such as TCP over IP over Ethernet).

Figure 5:
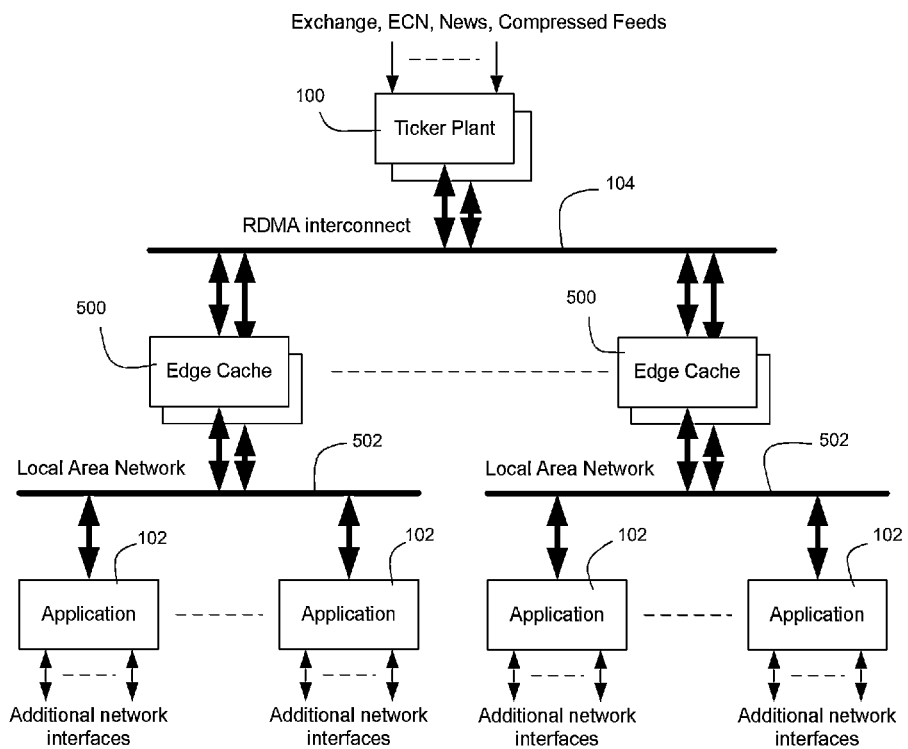
FIG. 5 depicts an exemplary distribution architecture over Local Area Networks (LANs) with edge cache appliances.
Figure 6:
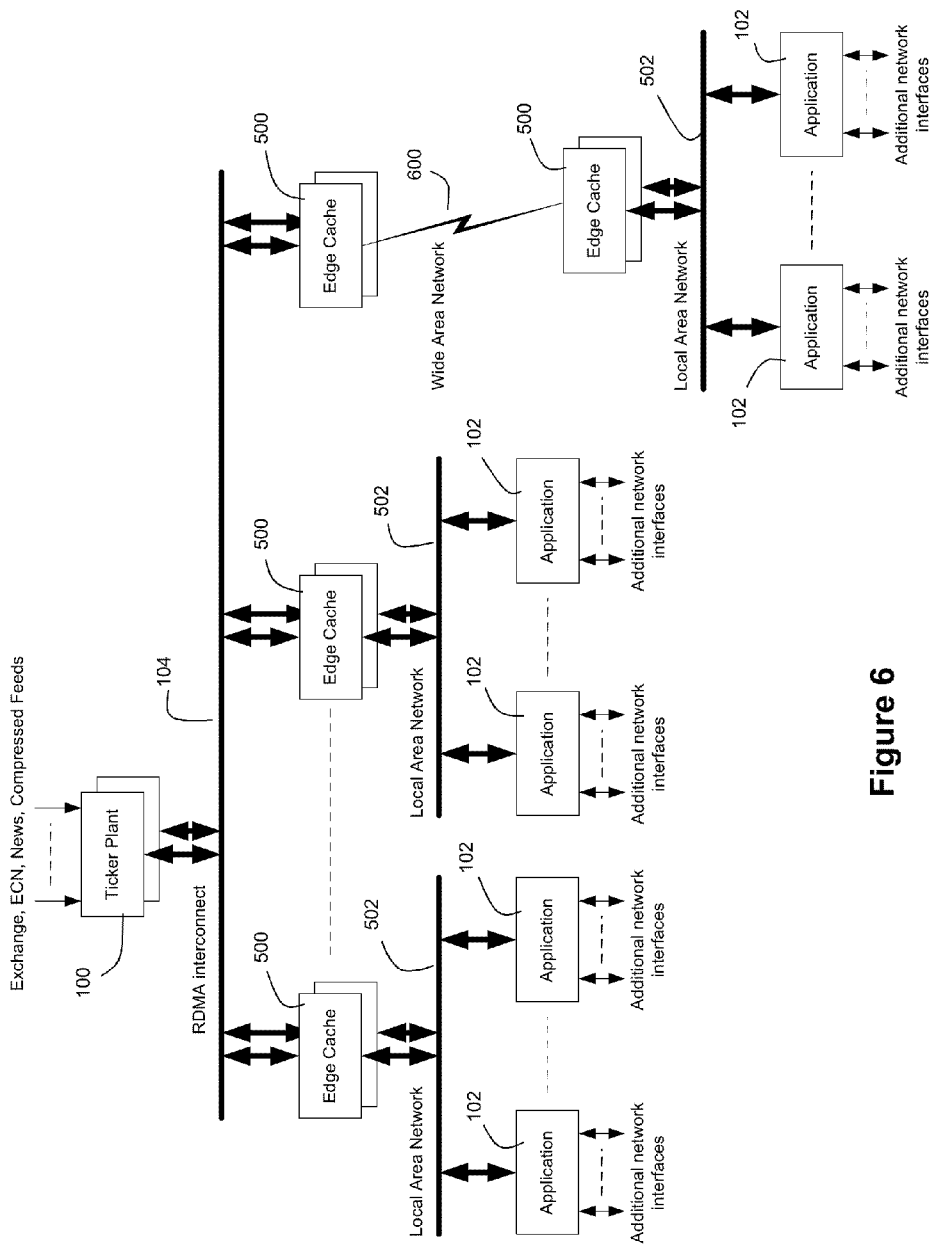
FIG. 6 depicts an exemplary distribution architecture over LANs and Wide Area Networks (WANs) with edge cache appliances.

FIG. 5 shows an exemplary distribution architecture that includes multiple Edge Cache appliances 500. The Edge Cache appliances 500 serves a similar purpose as the Connection Multiplexer 200, but allows real-time data to be distributed over commodity message-based interconnects. This includes unicast distribution protocols such as TCP/IP/Ethernet, multicast "messaging" services, etc. Note that the Edge Cache 500 may distribute data over a Local Area Network (LAN) 502 to consuming applications. The Edge Cache 500 may also transmit data over a Wide Area Network (WAN) 600 to a downstream Edge Cache that in turn distributes the data over a LAN to consuming applications, as shown in FIG. 6. This allows for a number of architectural possibilities, including distributing data to a set of applications in a remote location. Multiple collections of remote applications may be fed by a single data processing device in a geographically separate location. This can provide significant efficiencies, reducing the cost of deploying redundant data processing devices and potentially reducing the amount of interconnection bandwidth required to distributed data to the geographically distributed sets of applications. The Edge Cache 500 allows upstream data processing components, such as market data normalization engines, to be consolidated (replaced, enhanced, optimized, etc.) without perturbing the existing local, and possibly wide-area, distribution network.

Figure 7:
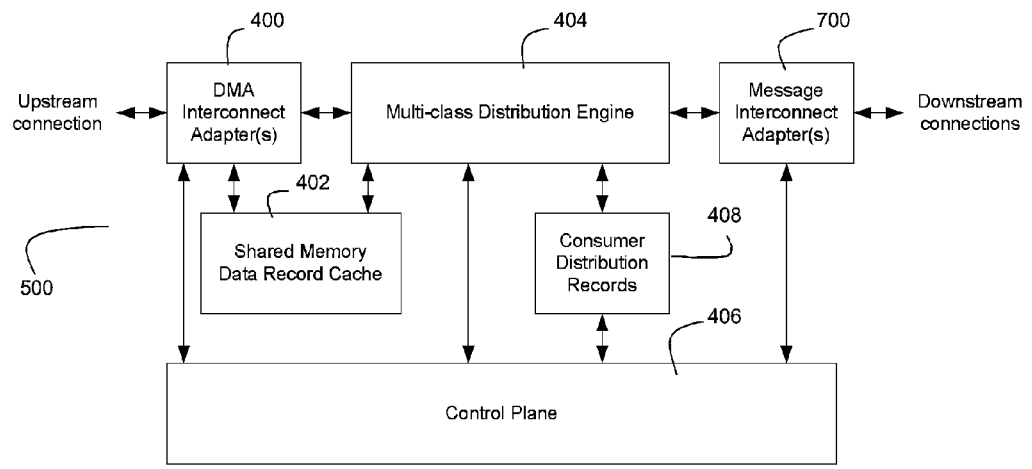
FIG. 7 depicts an exemplary edge cache appliance with data ingest via DMA interconnect.

FIG. 7 provides a block diagram of an exemplary Edge Cache device 500. Note that it can be identical to the Connection Multiplexer 200 with the following exceptions. The output interconnection adapter(s) 700 provide an interface to one or more message-based interconnection networks. Typically, this would be an Internet Protocol network built on top of an Ethernet local-area network. The Multi-class Distribution Engine 404 may provide all three classes of data distribution or a subset. For example, in one embodiment of an Edge Cache, the Multi-class Distribution Engine 404 may only provide metered data distribution.

Figure 8:
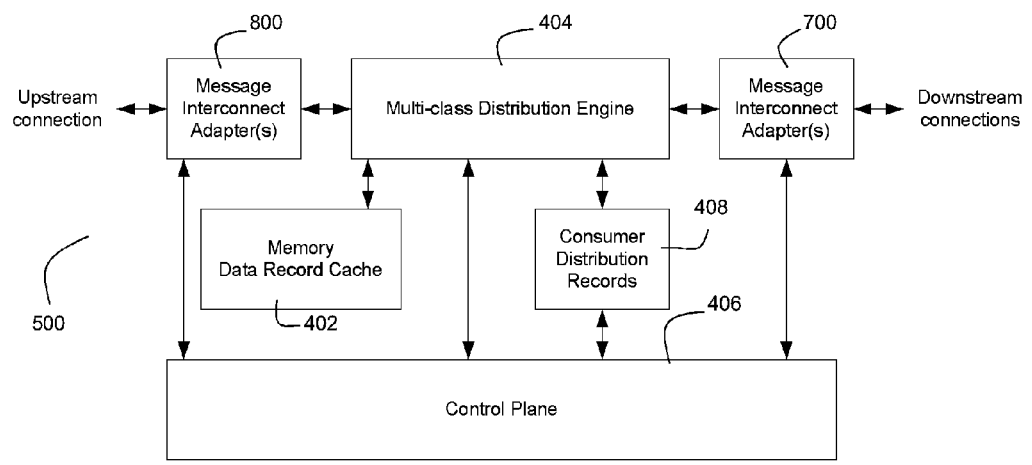
FIG. 8 depicts an exemplary edge cache appliance with data ingest via message interconnect.

FIG. 8 provides a block diagram of another exemplary embodiment of an Edge Cache device 500. Note that it can be identical to the Edge Cache shown in FIG. 7 with the following exceptions. The input interconnection adapter(s) 800 provide an interface to one or more message-based interconnection networks. This allows the Edge Cache 500 to be positioned downstream of another Edge Cache 500, or downstream of any message-based data distribution device.

The Edge Cache 500 may be implemented in a variety of ways. It may be implemented using standard interconnect adapters, general-purpose processors, and software. Higher capacity and lower latency may be achieved by employing chip-multi-processors (CMPs), graphics processors (GPUs), and/or reconfigurable logic. Thus, in embodiments where one or more components of the Edge Cache device is implemented in reconfigurable logic such as an FPGA, hardware logic will be present on the device that permits fine-grained parallelism with respect to the different operations that such components perform, thereby providing such a component with the ability to operate at hardware processing speeds that are orders of magnitude faster than would be possible through software execution on a GPP.

In the preferred embodiment, the Multi-class Distribution Engine 404 is implemented in one or more reconfigurable logic device(s). Preferably, the reconfigurable logic device(s) have direct access to high-speed memory for the Shared Memory Data Record Cache 402 and the Consumer Distribution Records 408. Preferably, direct access to the high-speed memory for the Shared Memory Data Record Cache is also provided to the upstream DMA adapter 400. Preferably, the upstream DMA adapter 400 communicates directly to the reconfigurable logic device(s) via a dedicated interconnect or high-speed system bus. Similarly, the reconfigurable logic device(s) communicate directly to the downstream message interconnect adapter 700 via a dedicated interconnect or high-speed system bus.

Figure 9:
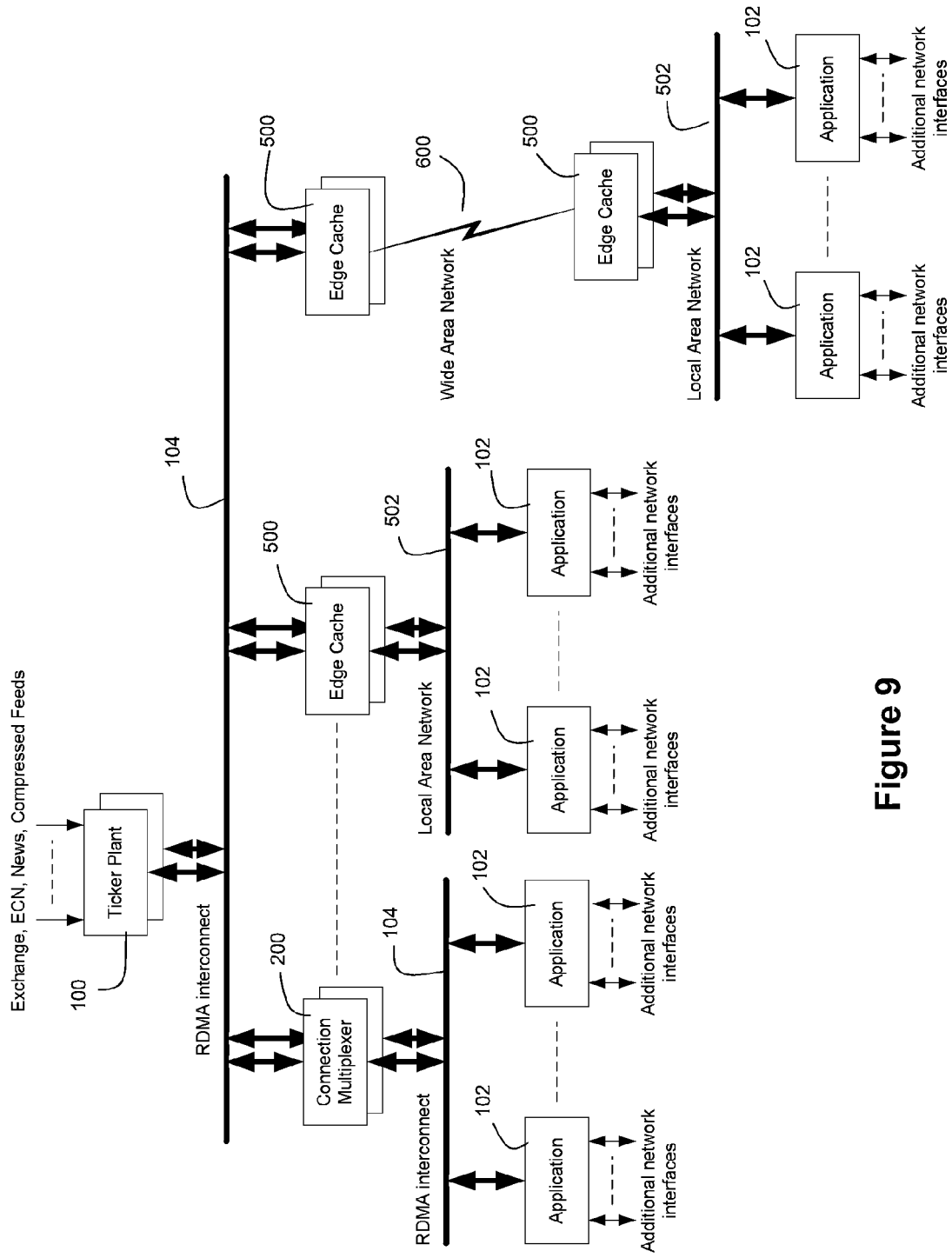
FIG. 9 depicts an exemplary hybrid distribution architecture with connection multiplexer and edge cache appliances.

As shown in FIG. 9, Connection Multiplexer and Edge Cache appliances 200 and 500 respectively can be combined in a number of ways to efficiently scale the distribution of real-time data to consuming applications 102. This allows a single (or small number) of data processing devices to service a large number of potentially diverse applications 102. The resulting performance improvements, cost savings, reductions in size and complexity provide significant benefit over the state of the art.

A. Multi-Class Data Distribution

Exemplary embodiments of invention may provide for any of the following three types of real-time data distribution, or any combination thereof:

1. Critical: deliver every update
2. Adaptive: deliver every update, conflate updates when congestion is detected
3. Metered: deliver updates at a configured rate (constant, maximum, etc.)

Figure 10:
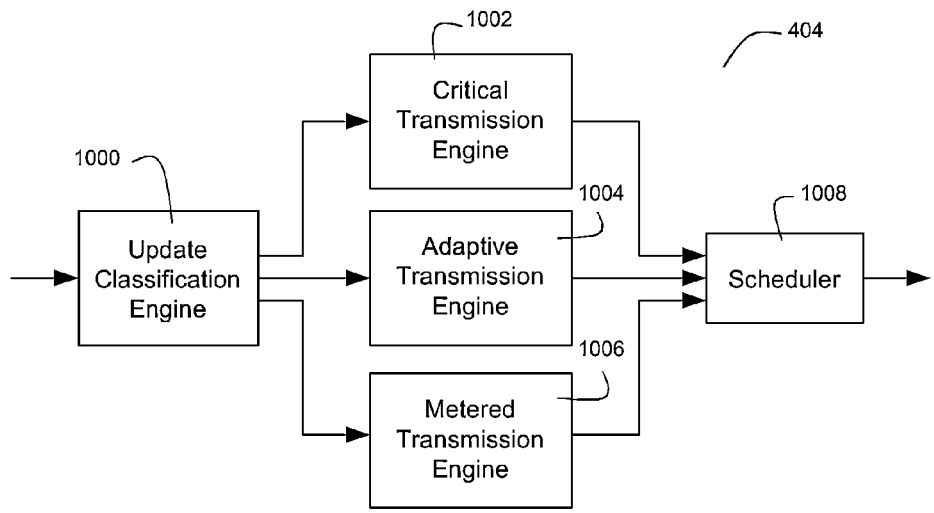
FIG. 10 depicts an exemplary multi-class distribution engine.

These types of data distribution can be realized via a Multi-class Distribution Engine (MDE) 404, an example of which is shown in FIG. 10. In the example of FIG. 10, the MDE 404 employs also three types of data distribution via a critical transmission engine 1002, an adaptive transmission engine 1004, and a metered transmission engine 1006, preferably deployed in parallel downstream from an update classification engine 1000 that directs updates to an appropriate on the parallel transmission engines. However, it should be understood that a given instance of an MDE 404 need not implement all three types of transmission engines; it may implement one or more of the types of data distribution. For example, an MDE 404 in a Connection Multiplexer 200 may implement the Critical and Adaptive types of data distribution, while an MDE 404 in an Edge Cache 500 may implement the Critical and Metered types of data distribution. Note also that an MDE 404 may also be included directly in a ticker plant appliance 100.

The type of data distribution used by the MDE 404 may be specified either statically or dynamically. In one embodiment, the control plane 406 statically configures the MDE 404 to use a given data distribution type. The configuration may be changed based on a control message generated by another system component, a disparate system, or an operator.

In another embodiment, the control plane 406 specifies a mapping from traffic class to data distribution type. The traffic may be classified according to one or more values in one or more fields in the updates. For example, the destination(s) (e.g. destination address or identifier) may be used to dictate the type of distribution. Multiple fields may also be used, such as the update type and the destination(s). Multiple field values may be specified by using field value ranges, field value prefixes, and regular expressions, as well as other known methods of specifying sets of field values. In one embodiment, the traffic classification mappings are loaded into the MDE prior at system start time. In another embodiment, the traffic classification mappings are modified dynamically based on control inputs from other system components, another system, or an operator.

In another embodiment, the mapping from traffic class to data distribution type is dynamically adjusted. This adjustment may be triggered by one or more input signals, including current distribution load, the number of downstream connections, congestion in downstream connections, system errors, etc.

The Consumer Distribution Records (CDR) 408 shown in FIGS. 4, 7, and 8 can act as a per-consumer state storage block for the MDE. The CDR contains one or more of the following sets of state data for each connection: destination identifiers (e.g. IP address, InfiniBand GUID, etc.), DMA address mappings (physical address pointers, subscription offsets, etc.), traffic class to data distribution mapping table (allowing for per-consumer data distribution type selection), and data distribution statistics (updates transmitted, congestion statistics, unique subscriptions, etc.).

The Scheduler 1008 shown in FIG. 10 schedules the output of the transmission engines on one or more output interconnection interfaces. In the preferred embodiment, the scheduler 1008 utilizes a weighted fair queuing algorithm, such as weighted deficit round-robin (WDRR), to provide weighted fair service the outputs of the transmission engines. This approach allows each transmission engine to consume a specified fraction of the output interconnection bandwidth. For example, output from the critical transmission engine 1002 may be given a greater weight than the output from the adaptive transmission engine 1004. Likewise, output from the adaptive transmission engine 1004 may be given greater weight that the metered transmission engine 1006. However, the scheduler 1008 ensures that each engine still gets its allocated bandwidth, even when an engine with a higher weight has data to send.

1. Techniques for Critical Data Distribution Using DMA

The transfer of critical data streams from producer to consumer presents a unique challenge for processing systems. Both the producer and the consumer require assurances that data transmission is occurring in sequence and without data loss. For time-critical environments, such as financial market processing systems, there is also a requirement to eliminate processing overhead to ensure minimal latency between the producer and the consumer. When a disruption in the flow of data occurs, one of the endpoints is typically informed so that corrective action can be taken. These actions can range from a retransmission of missing data to the complete shutdown of the transmission channel.

The presence of a feedback loop within the communication protocol enables the producer to detect when the consumer or communication channel is falling behind and unable to process the total volume of data that the producer is trying to send. Once a backpressure condition is detected, the producer can buffer data and delay transmission to the client. Due to finite resources on the producer, this response to backpressure is only effective for short durations. In addition to inducing latency in the delivery of data to the client, this behavior can also negatively impact the performance of the producer. This performance impact results from the overhead associated with processing feedback information. Once feedback information is received, additional processing is required to buffer and retransmit data. A poor behaving consumer can also have an adverse effect on a properly behaving consumer when both consumers are fed by the same producer. For producers that support large numbers of consumers, the problem of one consumer impacting data flows to another consumer connected to the same producer are compounded.

The adverse effects that result from poor behaving clients can be greatly reduced if the producer is not required to process feedback information from the consumer. This is typically accomplished with multicast transmission systems where one data stream from the producer is received and processed by multiple consumers. This configuration reduces the burden on the producer by shifting the workload to the consumer. With a multicast communication channel, the consumer is effectively listening to union of all traffic to all consumers and dropping events that are not pertinent. Aside from the additional compute resources required to filter the inbound traffic, the consumer also has to manage message ordering and react to data loss.

The remainder of this section presents an inventive technique that can be implemented by a critical transmission engine 1002, where this technique enables a producer to efficiently send unique data streams to multiple clients using remote direct memory access (RDMA). This technique allows a single producer to generate unique data streams to multiple consumers without the having to process feedback information from each client and without requiring each client to filter out unwanted data. This technique is ideally suited for the delivery of critical streams of market data to multiple consumers where each consumer requires a different event stream.

This technique for the efficient delivery of critical event streams to multiple clients is also well suited for implementation in hardware accelerated environments, including reconfigurable logic (e.g., FPGA devices), multi-core processors, intelligent communications nodes and other embedded or enhanced processing environments. Performance gains can be achieved by offloading the main processor on the producer system from the task of generating critical event streams. Additionally, moving the producer logic off of the core processor and into an intelligent NIC or hardware accelerated environment where the DMA engine lives eliminates the core processing cycles required to setup and initiate a DMA transaction. This frees up the core processor to perform other time critical tasks.

Thus, in embodiments where one or more components of the critical distribution engine 1002 is implemented in reconfigurable logic such as an FPGA, hardware logic will be present on the device that permits fine-grained parallelism with respect to the different operations that such components perform, thereby providing such a component with the ability to operate at hardware processing speeds that are orders of magnitude faster than would be possible through software execution on a GPP.

Each consumer 1100 reserves a block of memory to be used as the inbound data channel. This memory is employed as a ring buffer 1102 where the producer 1104 writes events to the ring buffer and the consumer reads from the ring buffer. In all cases, there is a single producer writing to the ring and a single consumer reading from the ring. Systems that require multiple data channels between the producer 1104 and the consumer 1100 can be implemented using multiple ring buffers 1102.

Figure 11:
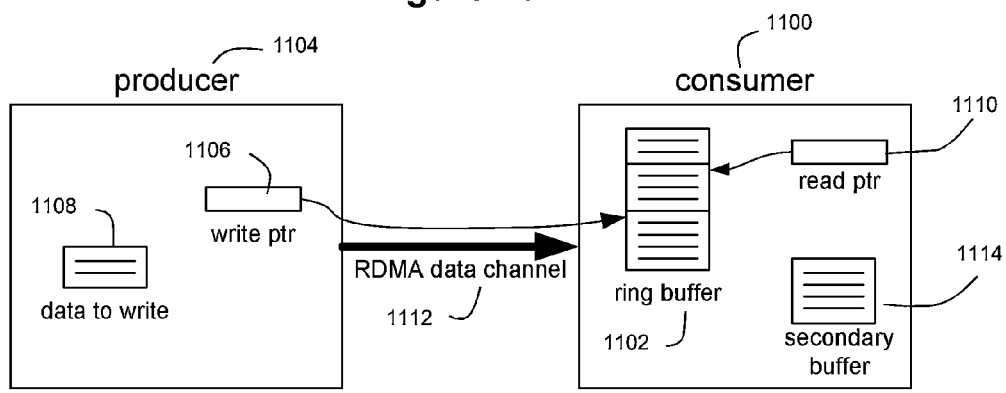
FIG. 11 depicts an exemplary embodiment for critical data distribution with data producers and consumers.

The producer maintains a write pointer 1106 that is advanced after an event 1108 is written to the ring 1102. The consumer maintains a read pointer 1110 that is advanced after an event is read from the ring. Unlike typical ring buffer implementations, the producer does not have visibility to the consumer's read pointer 1110 and the consumer does not have visibility to the producer's write pointer 1106. This enables the producer and the consumer to operate independently of each other. FIG. 11 shows the relative data structures and their location for both the producer 1104 and the consumer 1100.

Figure 12:
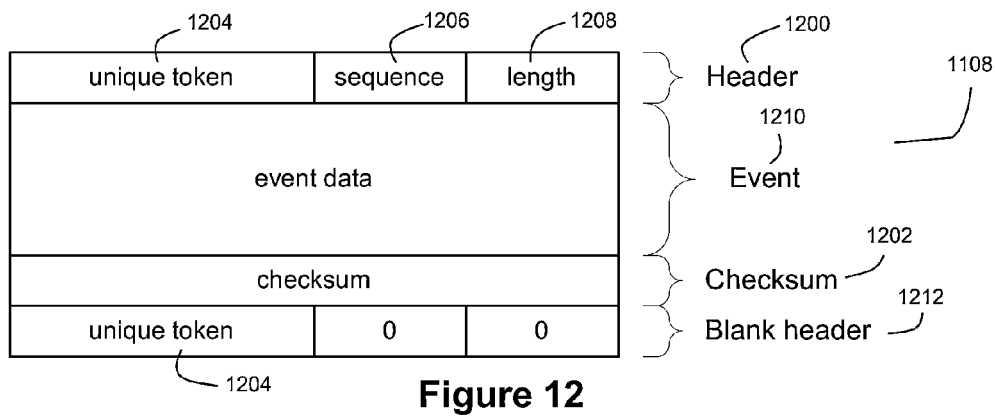
FIG. 12 depicts an exemplary consumer ring entry format.

FIG. 12 shows an example of a format of an event 1108 as written to the consumer's ring buffer by the producer. Events 1108 that are written to the ring buffer 1102 are preceded by a header 1200 and followed by a checksum 1202. The header 1200 contains a unique token 1204, a sequence number 1206 and an event length 1208. The checksum 1202 is computed across all the data in the event 1108 including the header value 1200. Events that are written to the ring always contain the following elements: a header with correct sequence and length, the event itself 1210, the computed checksum value, and a blank header 1212. A blank header 1212 is defined as header word containing only the unique token 1204 with zeroed out sequence number and length fields.

Upon creation of the ring buffer 1102, the consumer 1100 initializes its read pointer 1110 to point to the first memory location. The first memory location is also initialized to a blank header value 1212. This is the only time that the consumer writes to the ring. An out-of-band communication channel between the consumer and the producer is typically required in order to complete the registration and setup of the RDMA channel 1112. Once the RDMA channel 1112 is established, the consumer 1100 initiates processing by reading the value from its read pointer.

If the value at read pointer equals the blank header value 1212, then no data is available. Polling clients continue to read from the read pointer waiting for the value to change. Non-polling clients block on a wake-up event or signal indicating that data has arrived. If the value of the header at the read pointer contains an invalid unique token 1204, an invalid message length 1208, or an unexpected sequence number 1206, the consumer is in a data overrun condition and takes corrective action to resynchronize with the producer. If the header contains the expected value, the entire event is copied to a secondary buffer 1114. The secondary buffer 1114 prevents the producer from overwriting the event after it has been verified but before processing has been completed by the consumer. Once the event has been copied to the secondary buffer, the event checksum can be calculated and verified against checksum 1212. An incorrect checksum indicates that the consumer was reading the event at the same time the producer was writing the event. In this situation, the consumer restarts its event processing by retrieving and validating the write pointer value. A correctly verified checksum indicates that the consumer successfully received the next event. At this time, consumer specific processing of the new event can occur. After processing the event, the consumer advances its read pointer 1110 by the length of the event, including header and checksum fields. If the read pointer 1110 is advanced past the length of the ring buffer 1102 minus the maximum size of an event minus the size of a header word, then a wrap condition exists and the read pointer is reset to the beginning of the ring. This ensures that events always occur in contiguous memory and that a single RDMA transaction is sufficient to update an event. This reduces processing cycles for both the producer and the consumer during a wrap condition.

The resynchronization operation that occurs when an overrun condition is detected by the consumer contains two phases. The first phase resynchronizes the producer's tail pointer 1106 and the consumer's read pointer 1110 in the ring. An out-of-band communication, similar to that used during initial setup, allows the consumer to inform the producer of the overrun condition. Upon receiving this resynchronization message, the producer resets its sequence number to 1 and resets its write pointer to the base address of the ring buffer. The second phase resynchronizes processing state within the application. This phase is data-dependent and not within the scope of this disclosure, but may require the retransmission of missed events or the update of data elements that may be in an unknown state following the overrun condition.

The efficiency of the transport can be further improved by coalescing multiple events into a single RDMA transfer.

2. Techniques for Adaptive Data Distribution Using DMA

Variability in real-time data rates, finite bandwidth interfaces and interconnects, and finite processing capacity make guaranteed delivery of every update challenging. Typically, when a physical limit is reached in real-time data distribution, data is lost (e.g. the consuming application is disconnected from the producer if it cannot keep up) or data is delayed (e.g. the data is buffered at some point in the distribution system until congestion clears). In practice many applications prefer to receive every update when possible, but prefer to have real-time data summarized when delivery of every update is not possible, rather than experiencing data loss, disconnection, or delayed data. Adaptive data distribution meets the needs of this broad class of applications, including financial trading applications such as smart order routing (SOR) and high-frequency trading (HFT).

Here we introduce a technique for adaptive real-time data distribution by an adaptive distribution engine 1004 that utilizes DMA "push" (the data producer initiates memory write transactions directly to a shared memory region in data consumers), where this technique is amenable to implementation in reconfigurable logic, chip multi-processors, or other and other "acceleration" engines capable of offloading general purpose processors in a computing system. Thus, in embodiments where one or more components of the adaptive distribution engine 1004 is implemented in reconfigurable logic such as an FPGA, hardware logic will be present on the device that permits fine-grained parallelism with respect to the different operations that such components perform, thereby providing such a component with the ability to operate at hardware processing speeds that are orders of magnitude faster than would be possible through software execution on a GPP.

By utilizing a DMA push model, data delivery latency is minimized during non-congested periods. (As described in the Introduction, in a DMA read model the time for the read request to propagate from the data consumer to the data producer is added to the time required to deliver the data from the producer to the consumer.) Note that the adaptive distribution technique may be used over unicast or multicast DMA-capable interconnects. The basic idea is that the data producer attempts to write (push) an updated data record to a shared memory region in each consumer subscribed to the data item each time the data record is updated. Note that the shared memory region in a consumer is updated without participation from processing resources in the consumer system. Therefore, the rate at which updated records can be consumed is independent of consumer system processing resources. If the consumer is unable to immediately read the updated record, then the data record may be updated one or more times by the data producer. (Note that consumer system memory bandwidth does influence the rate at which shared memory in the consumer can be updated; however, this is typically not the primary bottleneck in data consuming systems.) When the consuming application reads the data record, it represents the most up-to-date version of the record. We describe techniques to ensure that data records presented to the application are coherent, as well as ways to off-load the coherency checks from the client system processing resources.

Note that the data producer may also be prevented from performing a DMA write transaction for every real-time update to every subscribed consumer. Finite output interface and interconnect bandwidth at the producer (e.g. Ticker Plant 100 or Connection Multiplexer 200), congestion in interconnect switches, or finite interface and memory bandwidth in consumers may prevent a given DMA write transaction from being successfully completed. As described below, the MDE 404 maintains a cache of the current data records as well as a record of pending updates for subscribed consumers. When congestion clears, the MDE works through the set of pending updates for each data item and subscribed consumer, distributing the current data record (which may represent the result of several real-time updates) for each data item.

In addition to the aforementioned benefits at the consumer, this technique for adaptive real-time data distribution also allows a system of producers, interconnects, and consumers to gracefully deal with instantaneous bursts in real-time data traffic. Data is only summarized (i.e. conflated) when congestion prevents a real-time update from producer to consumer and the amount of summarization (i.e. conflation) is dictated by the duration of the congestion. This obviates the need for disconnected consumers from the producer or queuing incremental real-time updates. As described in the Introduction, more processing resources and time would be required by the consuming application to read through a pending queue of incremental updates for the record. Instead, the consuming application now performs a single read operation and is presented with the most current version of the data record. This ability to maintain an up-to-date view of subscribed data records in local shared memory on the consumer system without consuming system processing resources provides a significant advantage to a broad range of applications.

Specifically, financial smart order routing (SOR) applications typically are event-driven by new orders that must be routed to an appropriate market for execution. When a new order for a specific financial instrument arrives, the SOR application typically retrieves the current pricing for the instrument at the market centers to which it may route orders. Based on this pricing information, it chooses the destination market for the order (see the above-referenced and incorporated patent application Ser. No. 13/316,332). Current pricing data is provided by market data feeds from each market center. As described in the above-referenced and incorporated patents and patent applications, market data can be normalized, enriched, and distributed to subscribing applications by a ticker plant engine. By eliminating the processing overhead of maintaining current views of the market for financial instruments, this technique of adaptive real-time data distribution makes more computing resources available to applications such as SOR.

We first describe adaptive distribution over a unicast DMA interconnect; a description of adaptive distribution over a multicast DMA interconnect follows. As part of the process of establishing a subscription to data items, consumer applications 102 allocate a contiguous block of memory to serve as the shared memory region 1300 into which the producer writes data records for subscribed data items. Note that if multiple applications share the same host system, a common shared memory region may be shared among multiple applications. The base (starting) address and the size of the memory block is transmitted to the producer. The Control Plane 406 in the producer is responsible for servicing connection and subscription requests from consumers, as described in the above-referenced and incorporated patents and patent applications. For each connected consumer, the Control Plane 406 establishes a record 1302 in the Consumer Distribution Records (CDR) block 408 as shown in FIGS. 4, 7, and 8. At minimum, each consumer record 1302 includes a consumer identifier (that uniquely identifies the consumer among the set of connected consumers to the producer), the interface address for the consuming application, the base address and size of the shared memory region in the consumer. In one embodiment, all consuming applications 102 allocate a shared memory region large enough to store all of the records for the known universe of data items. Typically, the shared memory regions would be of a common size among the consumers. This allows each data item to be assigned a single offset within the shared memory of all clients. This minimizes the amount of state storage space required by the CDR, but increases the memory utilization in the systems hosting consumer applications.

Figure 13:
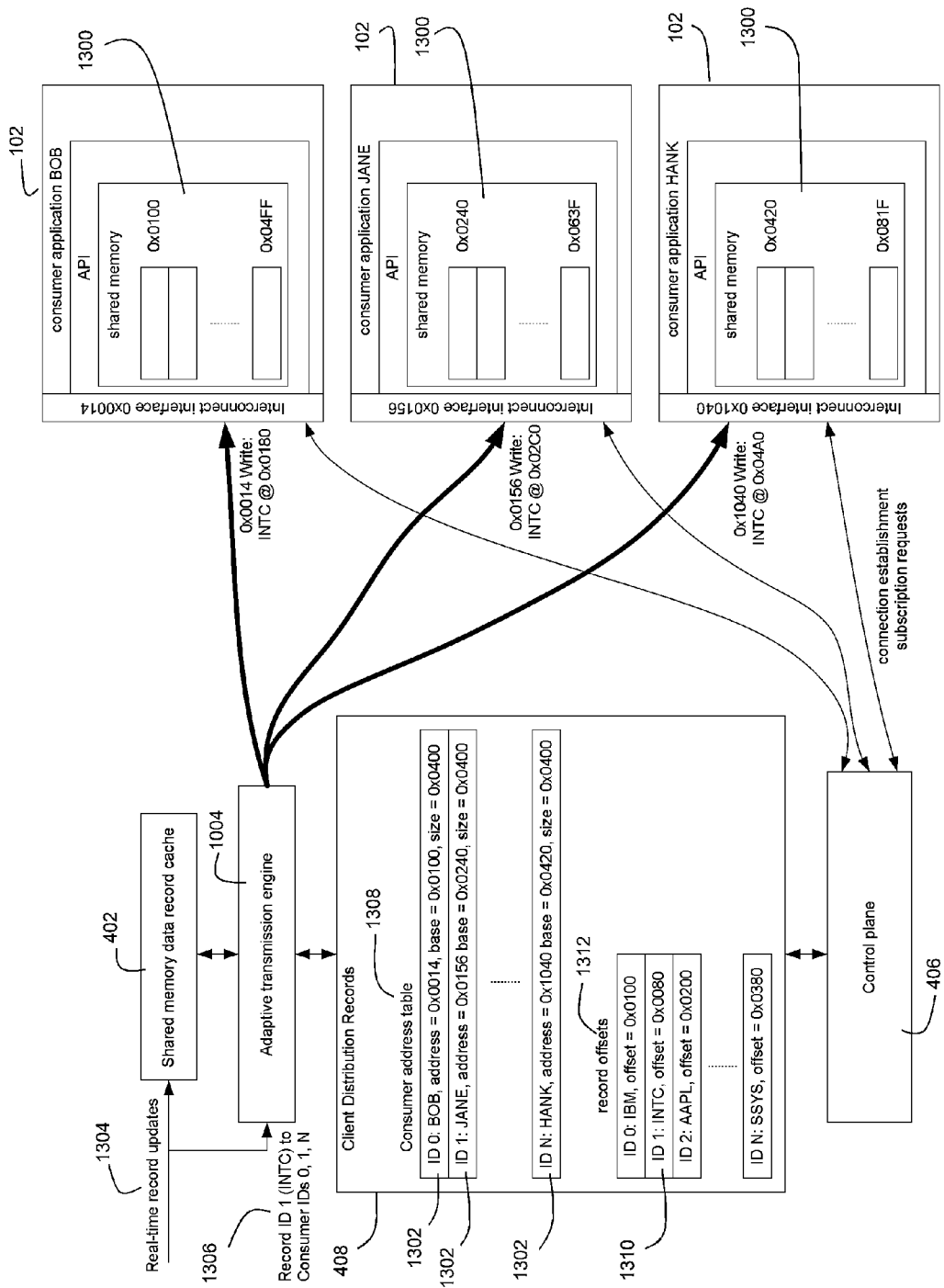
FIG. 13 depicts an exemplary embodiment for adaptive data distribution using a common shared memory map.

Consider the example provided in FIG. 13. An updated record for INTC 1304 is written to the shared memory data record cache in the MDE by an upstream component, and a notification 1306 of the update for INTC along with a subscription list (specified by consumer ID) is passed to the adaptive transmission engine. (In this example, we presume that the data has already been classified for adaptive transmission 1004.) The adaptive transmission engine adds the record ID for INTC to a queue of pending transfers for each of the listed subscribers. This queue can be resident within the adaptive transmission engine 1004 shown in FIG. 13. Note that the data structure used to maintain the queue of pending transfers does not allow redundant entries to be added to the queue. Thus, if an entry for INTC already exists in a pending transfer queue for a given consumer, then no changes are made to the queue. In the preferred embodiment, the adaptive transmission engine 1004 operates in parallel to service the pending transfer queues for all known consumers 1100. Preferably, the engine 1004 utilizes a fair queuing discipline to provide fair service to all consumers 1100. When the engine 1004 services the pending transfer queue for a given consumer, the engine looks up the consumer information in the consumer address table 1308. Using the record ID for pending data item, the engine looks up the offset 1310 for the record in the record offset table 1312. For each consumer, the engine 1004 initiates a DMA write transaction. The consumer is identified on the downstream interconnect using the address listed in the consumer address table 1308. The write address for the record update is the sum of the base address listed for the consumer in the consumer address table and the offset for the record. If a write transaction is successful, the engine 1004 moves on to the next consumer.

If the write transaction is not successful, the engine 1004 simply moves on to the pending transfer queue to service as dictated by the scheduling discipline. Note that the record ID for the failed record transfer remains on the pending transfer queue until a current update for the record is successfully written to the consumer's shared memory 1300. Also note that when the engine 1004 pulls a new record ID from a pending transfer queue, it reads a current copy of the record from the shared memory data record cache 402. This ensures that the most current version of the record is transferred to consumers.

A number of optimizations may be employed to minimize processing latency by the adaptive transmission engine 1004 and to reduce the number of record reads from the shared memory data record cache 402 by the engine 1004. One optimization is to attempt to send to all consumers of a given data item when a new record is read from the shared memory data record cache 402. This requires that the pending transfer data structures allow the engine to quickly identify whether or not an update for the given data item is pending for a given consumer. A hash table or Bloom filter can be used for efficient set membership queries. This optimization has the ability to send record updates for different data items out of relative order, e.g. an update for INTC may be transmitted prior to an update for CSCO, even though the record for CSCO was updated first. This is acceptable for applications that need not maintain relative synchronization among data items.

Figure 14:
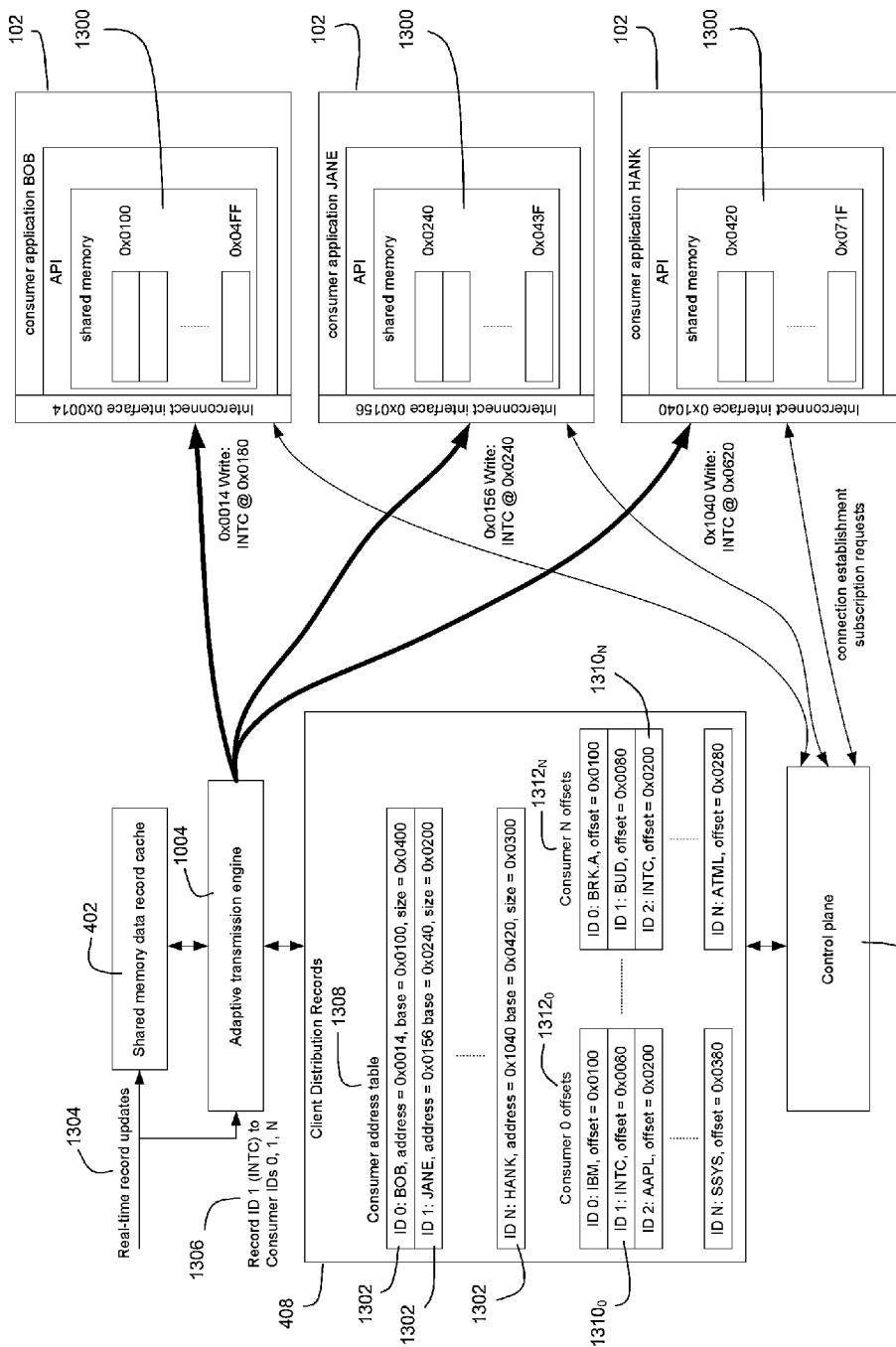
FIG. 14 depicts an exemplary embodiment for adaptive data distribution using per-consumer shared memory maps.

If the universe of data items becomes large and the amount of contiguous memory required on the consumer systems becomes prohibitive, the adaptive transmission engine 1004 can be extended to store a record offset table 1312 for each consumer. As shown in FIG. 14, the amount of state stored in the CDR 408 is increased so that each subscribed consumer (identified by their assigned ID) has an associated offset table $1312_0, \ldots, 1312_N$. This allows the consumer application to only allocate sufficient contiguous shared memory for the subscribed set of data items. Note that for each write transaction, the engine 1004 must compute the destination address for the write by adding the base address to the offset address for the given consumer i for the given data item (as read from offset record $1312_i$). This does increase the amount of state storage in the CDR 408, but the increase is likely far less than the amount of wasted shared memory in the common offset technique previously described.

Note that the adaptive transmission technique can also be applied across DMA-capable interconnects that provide multicast capability. In one embodiment, all consumers 1100 allocate a shared memory region 1300 starting at the same base address for the known universe of data items. The producer simply maintains a single mapping of offsets for data items and single base address register for all consumers.

Figure 15:
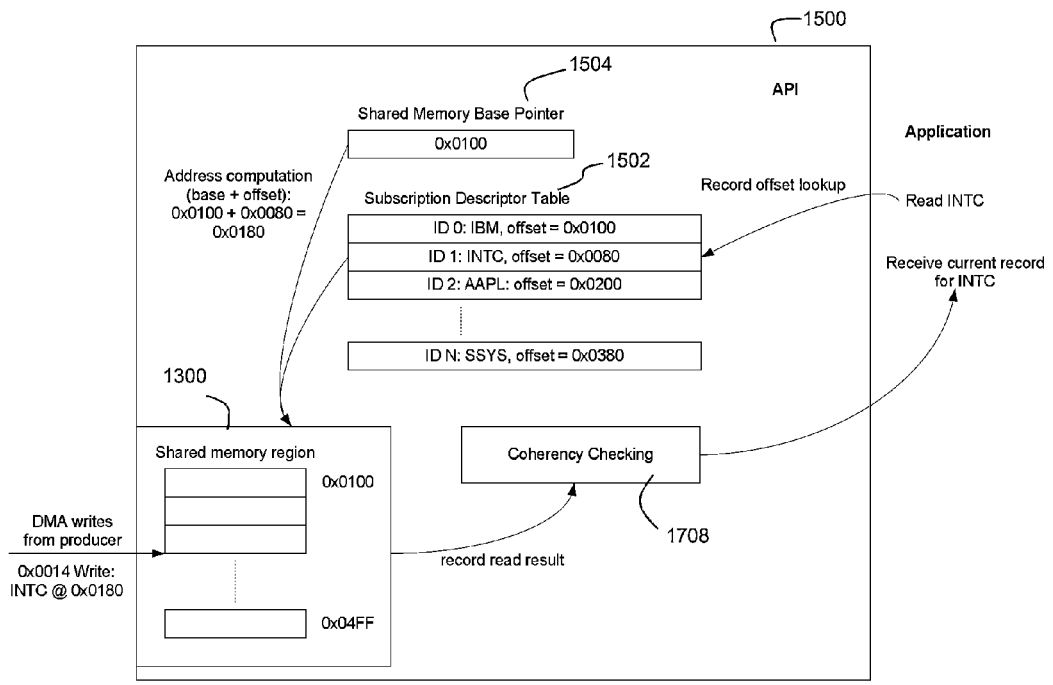
FIG. 15 depicts an exemplary application programming interface (API) for a consumer in an adaptive distribution scenario.

Mechanisms at the consumer must work in concert with the producer to present data transferred via adaptive transmission to consumer applications 102. In the preferred embodiment, these mechanisms are encapsulated in an Application Programming Interface (API). FIG. 15 provides an example of a consumer API 1500 that allows data to be received without consuming processing resources in the consumer system. As previously described, the producer performs DMA write transactions directly to the shared memory region 1300 in the consumer. When the consumer application 102 wishes to retrieve the current data record for a given data item, it requests the data record using a key. Typically, this would be the same key used to specify the data item at subscription time. The consumer API 1500 maintains an offset table 1502 that maps a given data record key to a relative offset (from the base address of the shared memory region (see pointer 1504) for the data record. Note that additional data record attributes such as record size may also be stored in the offset table. In the simple example of FIG. 15, the records are of a known constant size. The API 1500 performs a lookup in the offset table for the given key. Using the offset and the base address for the shared memory region, the API performs a read operation from the shared memory region 1300.

Note that the shared memory region 1300 is not "locked" and the producer is not explicitly prevented from writing to the same memory location that the API 1500 is reading from. For records that occupy more than one physical memory "slot", there is also a possibility that the producer could be writing one portion of the record while the consumer is reading a different portion. As mentioned in the Introduction, computing systems that utilize NUMA may issue memory access operations out of order. In order to ensure that a coherent version of the record has been retrieved, prior to returning the record to the requesting application, the API 1500 must perform a coherency check 1708. There are various ways to ensure record coherency, including checksums, Cyclic Redundancy Check (CRC), and hash digests (e.g. MD5). In the preferred embodiment a checksum is used due to its simplicity and computational efficiency. Prior to transmitting the updated record, the producer computes a checksum over the record and appends the checksum to the record. The consumer API 1500 reads the record and appended checksum, computes a checksum over the record, and compares its computed checksum with the checksum computed by the producer as described above. If the checksums match, then the consumer API 1500 delivers the record to the requesting application 102. If the checksum fails, then the consumer API 1500 or the consumer application 102 may retry the read operation. The record request function call may be implemented as either a blocking or non-blocking call, as is well-known in the art.

Note that the coherency check consumes processing resources, however these resources are only consumed at record retrieval time. Thus, no consumer processing resources are required to update the data record in client shared memory 1300. In one embodiment, general purpose processors on the consumer computing system may be employed in order to perform the coherency checks. In a subsequent section, we describe mechanisms to offload and accelerate these coherency checks from general purpose processors in consumer computing systems.

Figure 16:
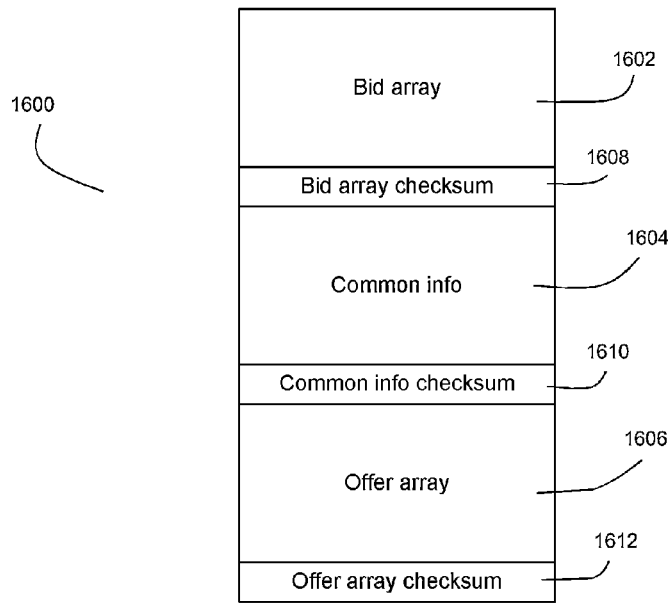
FIG. 16 depicts an exemplary multi-part record for financial order books.

For applications, such as order books and price books in financial market data, efficiencies may be gained by having the producer only update a subset of a given data record. As shown in the example of FIG. 16, a record 1600 may be subdivided into multiple parts, each covered by its own checksum (e.g. checksums 1608, 1610, and 1612). As described in the above-referenced and incorporated WO Pub. WO 2010/077829, a price book for a financial instrument is a pair of sorted arrays of bids and offers to buy and sell, respectively. Each array entry typically includes the price, quantity or aggregated quantity at the price, order count at the price, market, market participant identifier, and other attributes such as implied liquidity. In the example, a price book record 1600 for a financial instrument is divided into the three parts: bid array portion 1602, common information portion 1604, and offer array portion 1606. The common information includes data fields that apply to the instrument as whole such as trading status (e.g. open, closed, halted) and the sequence number of the most recent update event. When a new order to buy the instrument arrives, the bid array and common information may be updated. The producer computes new checksum values for the bid array and common information portions of the record prior to transmitting those record portions to consumer(s). Note that the common information section 1604 is interposed between the bid array 1602 and ask array 1606 in the record layout. This allows the producer to perform a single write operation to consumers when an update changes the common information portion of the record in addition to the bid array portion or ask array portion.

Figure 17:
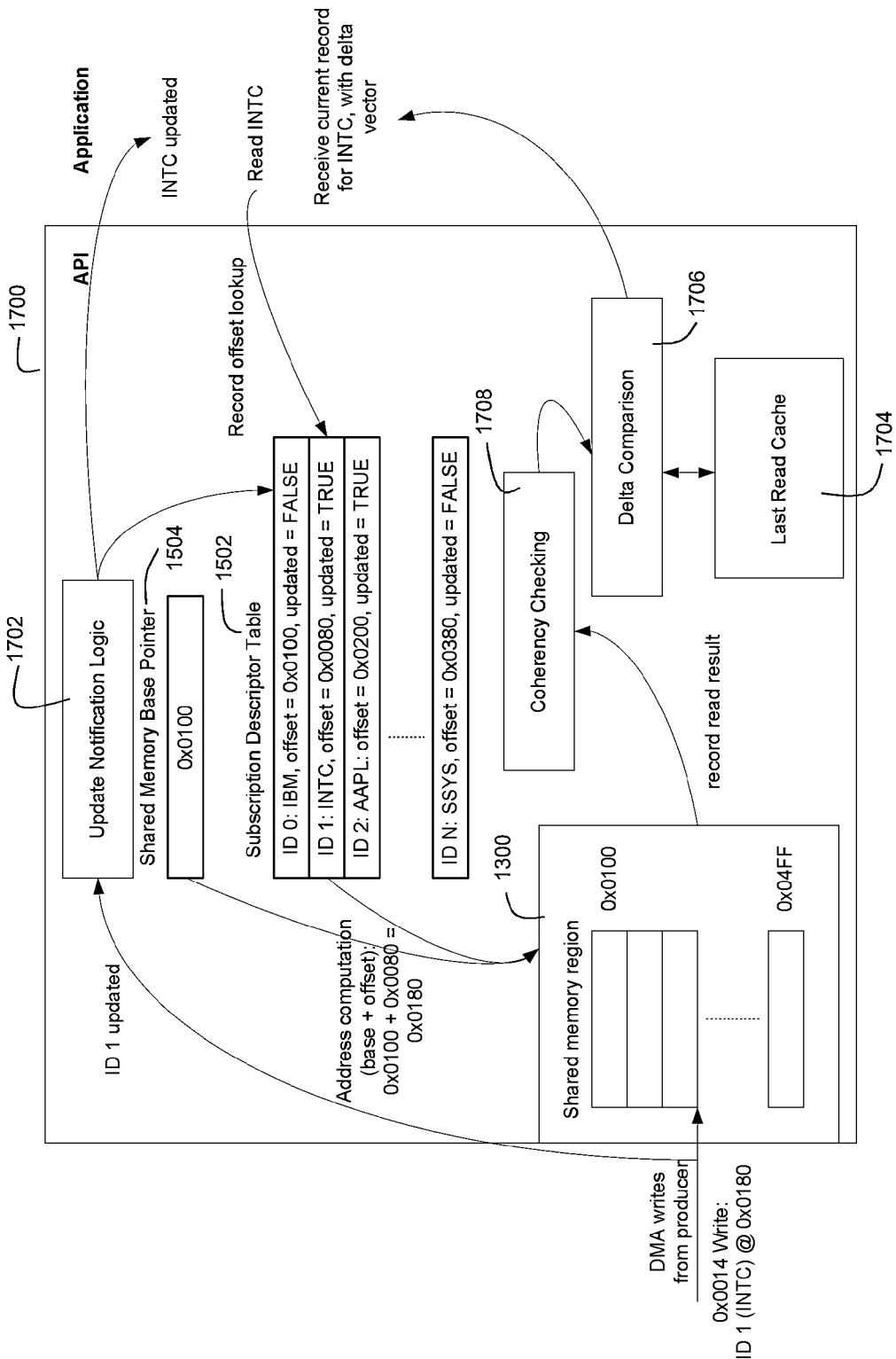
FIG. 17 depicts an exemplary API with notification logic for a consumer in an adaptive distribution scenario.

Note that the consumer mechanisms shown in FIG. 15 are appropriate for applications that prefer to retrieve data records at a time of their choosing (e.g. periodically, event-driven from a different data source, continuously polling, etc.). Other applications may wish to be notified when records for subscribed data items have been updated by the producer. FIG. 17 provides an example of a consumer API 1700 that includes mechanisms to provide this notification to the consumer application. When the producer updates a record in the shared memory region 1300 of the consumer, it also deposits an identifier for the updated record in a queue in the consumer. In the example, the queue is contained within the Notification Logic block 1702 in the consumer. Note that some interconnects allow this operation to happen as part of the write transaction to the shared memory region 1300. For example, InfiniBand allows an "immediate" field to be included with the completion event that is delivered to the consumer when a DMA write transaction occurs. The notification logic 1702 reads the queue of identifiers and uses these identifiers to notify the consumer application 102 of a record update. As part of the notification, the logic 1702 may update additional meta-data such as an updated flag in the table 1502 that maps a key to a shared memory index that reflects whether or not the record has been updated since it was last read by the consumer application. This provides for optimizations such as immediately returning a "not updated" response to a read request from the consumer application 102.

Consumer applications 102 may also desire to know which fields in the data record have changed relative to the last retrieval of the record. In order to provide this capability, the adaptive consumer API 1700 maintains a cache 1704 of the most recent data records retrieved by the consumer application. When the consumer application retrieves a new data record, delta comparison logic 1706 computes the difference between the new record (that has passed coherency checking 1708) and the most recent record delivered to the client application. Identifying which record fields changed may be accomplished in a variety of ways. The delta comparison logic 1706 may append a list of field identifiers for the fields that have changed, each field may be assigned a "changed" Boolean flag that is set to true or false, etc. Once the new record is delivered to the consumer application 102, the last read cache 1704 is updated.

Consumer applications may want to exert finer-grained control over when they are notified of updates to subscribed records. As shown in the exemplary API 1800 of FIG. 18, an update notification filter logic block 1802 may be interposed. Consumer applications may specify a variety of notification rules for each subscribed data items. Exemplary notification rules include:

Price change threshold, e.g. financial instrument price must have changed by a specified delta
  Update conditions, e.g. financial instrument quote conditions (don't notify on "slow" or "manual" quote conditions) or trade conditions (don't notify on "off-exchange" trade conditions)
  Size change threshold
  Latency change threshold, e.g. do/don't notify application if processing or transmission latency exceeds a threshold
  Only notify when derivative financial instruments are "in the money", e.g. currently exercising the equity option results a profit for the option holder Preferably, consumer applications may dynamically apply/change filter rules via the API. Note that if the application chooses to retrieve a data record between notifications, it would receive the most current data record that was successfully written to the shared memory region, even if a notification was not generated.

Regarding data delivery latency measurement, note that the producer can include one or more timestamps in the data written to the consumer shared memory region. For example, the producer may include timestamps for the following: when it initiated data processing/generation, when it completed data processing/generation, when it invoked the DMA write operation to the consumer. This provides for measurement of producer processing and data delivery latency, independent of the processing capacity and speed of the consumer(s).

Figure 18:
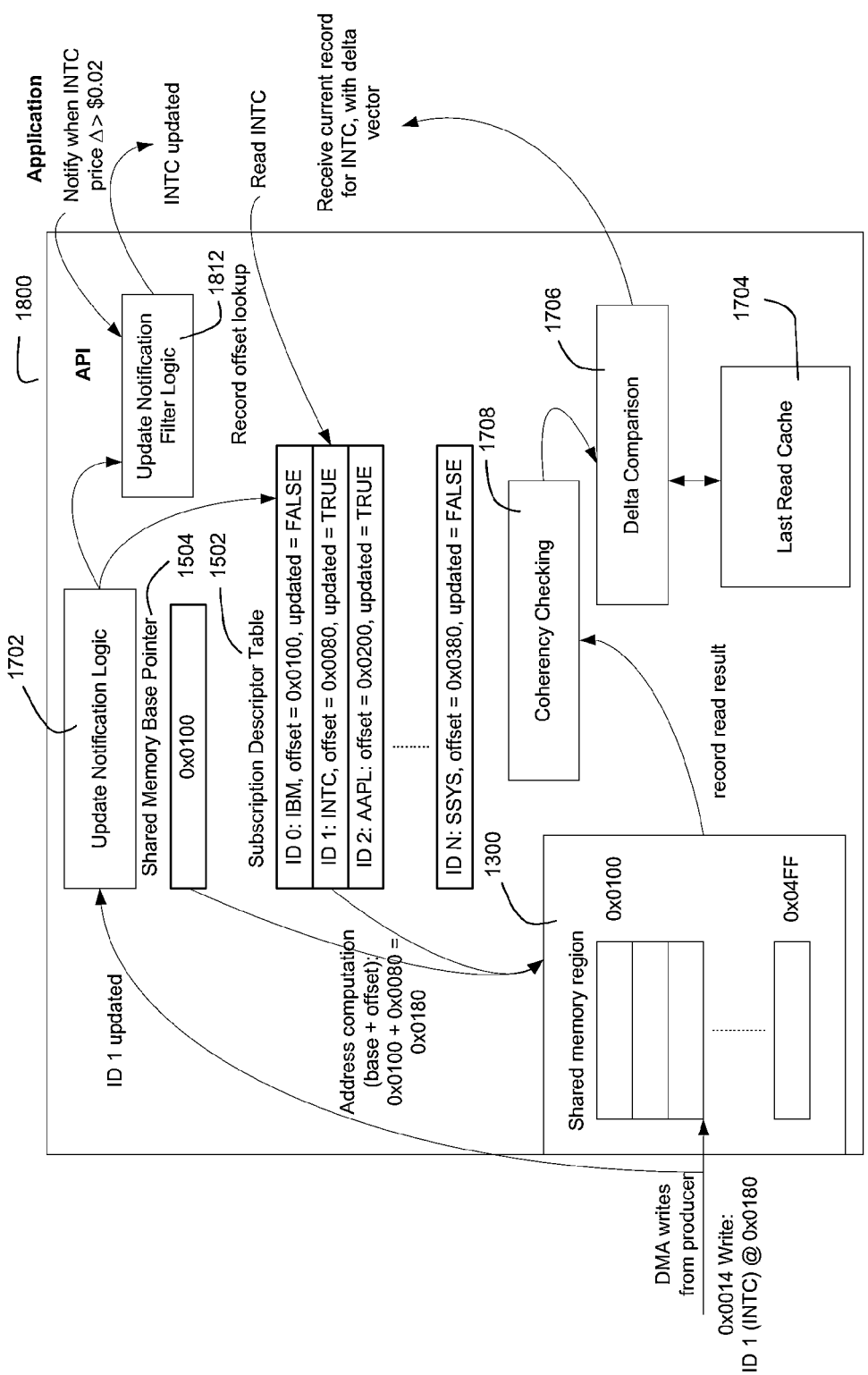
FIG. 18 depicts an exemplary API with notification filtering for a consumer in an adaptive distribution scenario.

Note that the notification, notification filtering, and delta comparison mechanisms, as shown in FIGS. 17 and 18, use processing resources at the consumer in order to process the events from the producer, update consumer tables or data structures, optionally notify the consumer application, and compute relative differences in the new data record. In one embodiment, these processing resources may be general purpose processors on a standard consumer computing system. In a subsequent section, we describe mechanisms for offloading and accelerating notification logic and notification filtering from the general purpose processors in consumer computing systems.

Note that multicast capabilities may be reliable or unreliable. If the interconnect provides a reliable multicast service, then the producer needs to select a strategy for dealing with failed data deliveries to a subset of the consumers.

3. Techniques for Metered Data Distribution

In a metered data distribution technique, a predefined maximum event rate limits the rate at which update messages are sent to the consumer. If the producer detects a larger potential outbound message rate, it will summarize or drop events before sending to the consumer. This ensures that the maximum event rate is never exceeded. The metered technique can be further subdivided into four categories: a per-producer rate, a per-consumer rate, a per-data item rate, and a per-consumer/per-data item rate. In a per-producer rate technique, a single rate is use to limit the maximum traffic rate of all data items delivered to all consumers. In a per-consumer rate technique, each consumer can specify its own maximum data rate. A single producer servicing multiple consumers will support a different maximum rate for each consumer. In a per-data item rate technique, a maximum data rate for individual data items can be set, but all consumers receiving a specific data item will all receive data at the specified rate. In a financial data delivery system, updates for the stock symbol IBM could be metered at a different rate than those for the stock symbol APPL. In a per-consumer/per-data item rate technique, the maximum rate is specified by the consumer at subscription time for each data item. This provides the most flexibility for consumers, but adds complexity to the producer.

In this disclosure, we present an inventive technique for metered per-consumer/per-data item data distribution that can be implemented by a metered distribution engine 1006. Additionally, we extend the per-consumer/per-data item rate technique to include a data class metered technique. This allows different classes of data to be metered at different rates. For instance, level 1 quote updates could be metered at 4 updates per second, level 2 price book updates could be metered at a 20 updates per second, and trade reports could be not metered at all. This type of metered technique provides the ultimate in flexibility for clients that have varying metering requirements across a large consumer base. These varying metering requirements can be imposed by the consumer applications, end system processing capacities, network bandwidth, or other types of constraints.

Additionally, our metering framework has been designed to function in a distributed environment, where meter rates can be further restricted throughout a chain of multiple distribution nodes, as shown in FIG. 9. Furthermore, an exemplary metered distribution engine 1006 in accordance with this technique is amenable to implementation in reconfigurable logic, chip multi-processors, or other and other "acceleration" engines capable of offloading general purpose processors in a computing system. Thus, in embodiments where one or more components of the metered distribution engine is implemented in reconfigurable logic such as an FPGA, hardware logic will be present on the device that permits fine-grained parallelism with respect to the different operations that such components perform, thereby providing such a component with the ability to operate at hardware processing speeds that are orders of magnitude faster than would be possible through software execution on a GPP.

Figure 19:
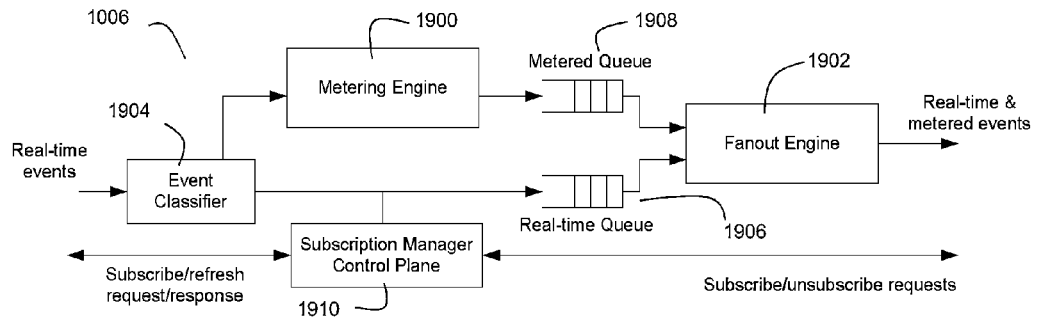
FIG. 19 depicts an exemplary metered transmission engine.

A typical transmission engine for a unicast communication network contains a fanout engine that is responsible for replicating inbound events to each of the connected clients. Adding metering logic to the fanout engine typically results in degraded performance for non-metered clients due to the extra processing requirements associated with conflating data for selected clients. In order to address the performance implications of conflating data within the fanout engine, we present an inventive technique for delivering metered data to multiple clients, where each client has the ability to select a unique metering rate for different content. FIG. 19 shows diagram of an exemplary metered transmission engine 1006 that includes separate metering and fanout engines 1900 and 1902. By separating the metering engine 1900 from the fanout engine 1902, separate compute resources can be applied to the task of enforcing metered rates for the connected clients without impacting non-metered data. Data received by the transmission engine 1006 is either passed to the metering engine 1900 or the fanout engine 1902, based on the outcome of the event classification by the event classifier 1904. Data items that are eligible for metering are routed to the metering engine 1900 whereas data items that cannot be metered are sent directly to the fanout engine 1902. This ensures that non-metered data items are not delayed by metering specific processing.

The metering engine 1900 typically supports rates from 1 update per second to 1000 updates per second or no metering where every event is delivered to the client. The metered transmission engine 1006 is configured at startup with a maximum update rate which limits the rate at which individual update events will be sent to clients. A value of zero for the maximum update rate indicates that clients can request unmetered updates for the metered eligible data items.

A typical configuration for financial market data is to enable metering for level 1 (top-of-book) quote traffic, but support every tick delivery for other events such as trade reports and trading actions. Due to the high volume of quote traffic relative to the trade reports, this enables clients to match the network bandwidth and data processing capabilities of their environment to the demands of their applications relative to the market data event rates.

Figure 20:
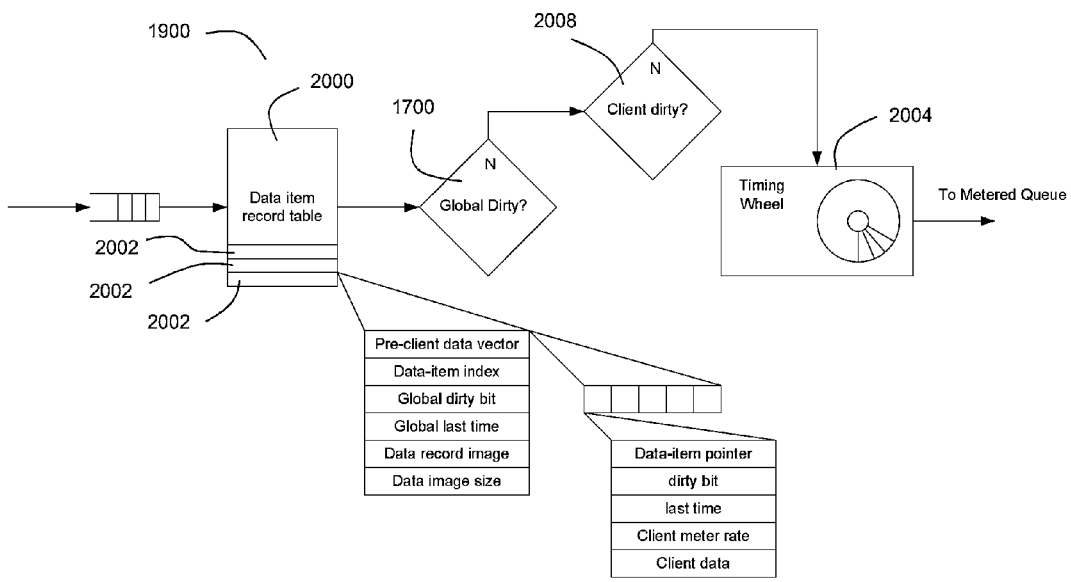
FIG. 20 depicts an exemplary metering engine.

A diagram of an exemplary metering engine 1900 is shown in FIG. 20. The metering engine maintains the following records 2002 in table 2004 in order to implement the per-consumer/per-data metered transmission technique.

Each metered data item per subscription can have a record containing the following information:
  A per client data map that maintains a list of clients that have subscriptions to the item.
  An item index number that uniquely identifies the data item.
  A global dirty bit that is set when an update for this data item is waiting in the pending send queue.
  A global last time sent that is used in order to meter the data item on a system-wide basis.
  A current cached image of the data item record.
  The size of the cached image.
A record of per-client data containing the following information will be linked into the data item record's per-client data vector:
  A dirty bit indicating that a data update is already pending for this client.
  A link to the data item node for this client.
  The client specific meter rate is used in conjunction with last time sent in order to properly meter on the per client basis.

The last time sent is used in conjunction with the client meter rate in order to properly meter on the per client basis.

Pointer to the client specific data.

The following logic applies when creating or updating the records associated with metering processing. When a client's subscription request is received by the subscription manager 1910, a call is made into the metering engine to add the pending subscribed client to a temporary mapping. If a bad subscription response is returned, the pending subscription is removed from the system, otherwise, an initial data item record image (refresh) is requested for the data item. The client specifies the desired metering rate in the subscription request. The event rate received by the client is limited by the maximum update rate configured on the transmission engine. The metering engine 1900 allows the subscription manager pass a client id, turnkey, and meter rate upon client subscription. The metering engine 1900 will set up the appropriate records to complete the subscription when a refresh is received that matches that turnkey. During an unsubscription, the subscription manager synchronizes with the metering engine in order to update records in the metering engine to stop the flow of data to the client.

The following outlines the use of a constant insertion time timing wheel 2004 for managing rate limited events.

With a constant insertion time O(c), a timing wheel 2004 provides a more efficient mechanism for maintaining an ordered sequence of queued tasks with different start times. By contrast, an insertion sort algorithm has a worst case performance of $O(n^2)$.

If we limit the meter interval to 1 ms and the maximum time between metered updates to be 1 s, the timing wheel can be limited to 1000 entries.

Each entry in the timing wheel points to a linked list of waiting metered events to be sent at that positional millisecond offset.

Each update event that requires metering will be inserted into the appropriate millisecond granularity 'bucket' in the timing wheel 2004.

The insertion point will depend the current position if the timing wheel, the metering interval for that client, and how long it has been since the last send.

The timing wheel advances to the next bucket every millisecond. Newly inserted updates must be placed far enough from the current timing wheel pointer to allow the correct number of milliseconds to pass prior to processing the inserted event.

When servicing pending updates, the metering engine only has to check the current time against the last time the timer wheel advanced. If it is time for the wheel to advance, advance the wheel, process the linked list of clients, send a metered update to each client, and update the last time sent for each entry.

The core logic of the metered transmission engine 1006 performs the following tasks:

The event classifier 1904 passes non-metered event types to the Fanout Engine 1902 via the Real-time Queue 1906.

The event classifier 1904 passes metered events types to the Metering Engine 1900, which does the following:

Lookup the data item record 2002 in the data item record table 2004, preferably using a hash of the data item index.

Update the data item record 2002 with information from the event. Depending on the event type and data, this may include summary computations.

Check the Global Dirty Bit (step 2006).

If set, continue on to the next event. This effectively conflates the update and causes the latest (summarized) data item content to be transmitted at the next meter interval.

Otherwise, add the data item to the Pending Send Queue. Set the Global Dirty Flag in the data item record.

The Metering Engine performs the following operations to service the Pending Send Queue:

For every data item in the Pending Send Queue:

Iterate over the Per Client Data Vector, for every Client Data Record and do the following for each:

Check Client Record dirty bit (step 2008).

If set, the update is already in the Rate Limited Ring, ignore this update.

Otherwise, check the metered rate and last time sent to decide if the update can go out to the client now.

If the update can go out, generate the event from the data item record for the client and place into the Fanout Unit's Metered Ring Buffer 1908. Clear the Client's dirty bit.

Otherwise, place the Client into the Rate Limited Queue. Set the Client's dirty bit.

Clear the data item record's Global Dirty Bit after processing the entire Per Client Data Vector associated with the data item record.

Continue to process the data items in the Pending Send Queue until the queue is drained.

The Fanout Engine 1902 is responsible for distributing events to the specified clients. In the preferred embodiment, the fanout engine 1902 provides fair service to Rate Limited Queue 1908 and the Real-time Queue 1906.

B. Multi-Class Data Consumption and Presentation

As previously described, the data consumption and presentation functions in the consumer require processing resources in the consumer system. In one embodiment, these processing resources are general purpose processors (GPPs). By using GPPs, the data consumption and presentation functions effectively reduce the amount of GPPs available for consumer application processing. Here we describe mechanisms to offload data consumption and presentation processing to an API offload engine 2100. The API offload engine 2100 may be implemented using a variety of technologies, including reconfigurable logic, chip multi-processors (CMPs), and graphics processing units (GPUs). Thus, in embodiments where one or more components of the API offload engine 2100 is implemented in reconfigurable logic such as an FPGA, hardware logic will be present on the device that permits fine-grained parallelism with respect to the different operations that such components perform, thereby providing such a component with the ability to operate at hardware processing speeds that are orders of magnitude faster than would be possible through software execution on a GPP.

Figure 21:
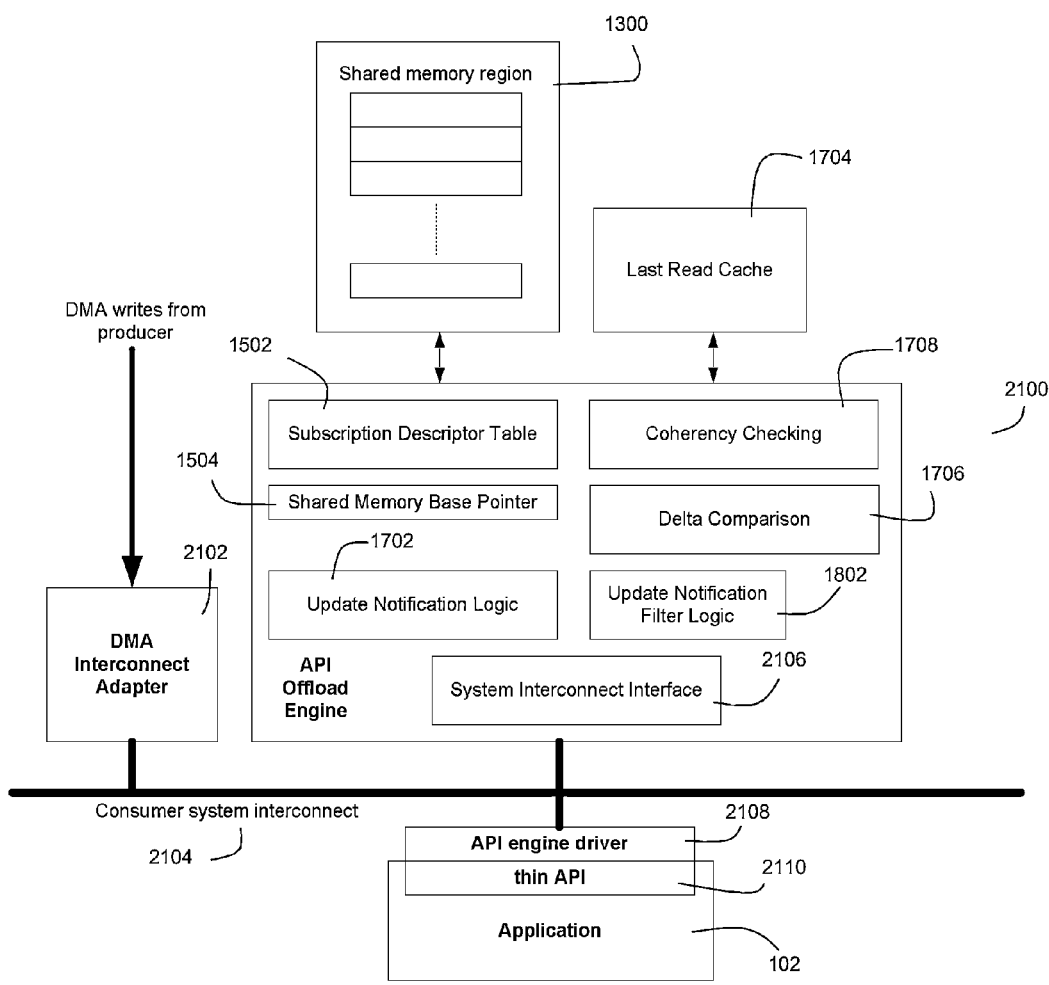
FIG. 21 depicts an exemplary API offload engine.

As shown in FIG. 21, the API offload engine 2100 may be realized as an adapter board that plugs into a consumer system interconnect "slot". The API offload engine 2100 may also be realized on the same motherboard as the other consumer system processing components, as well as other types of mezzanine or extension boards.

Figure 22:
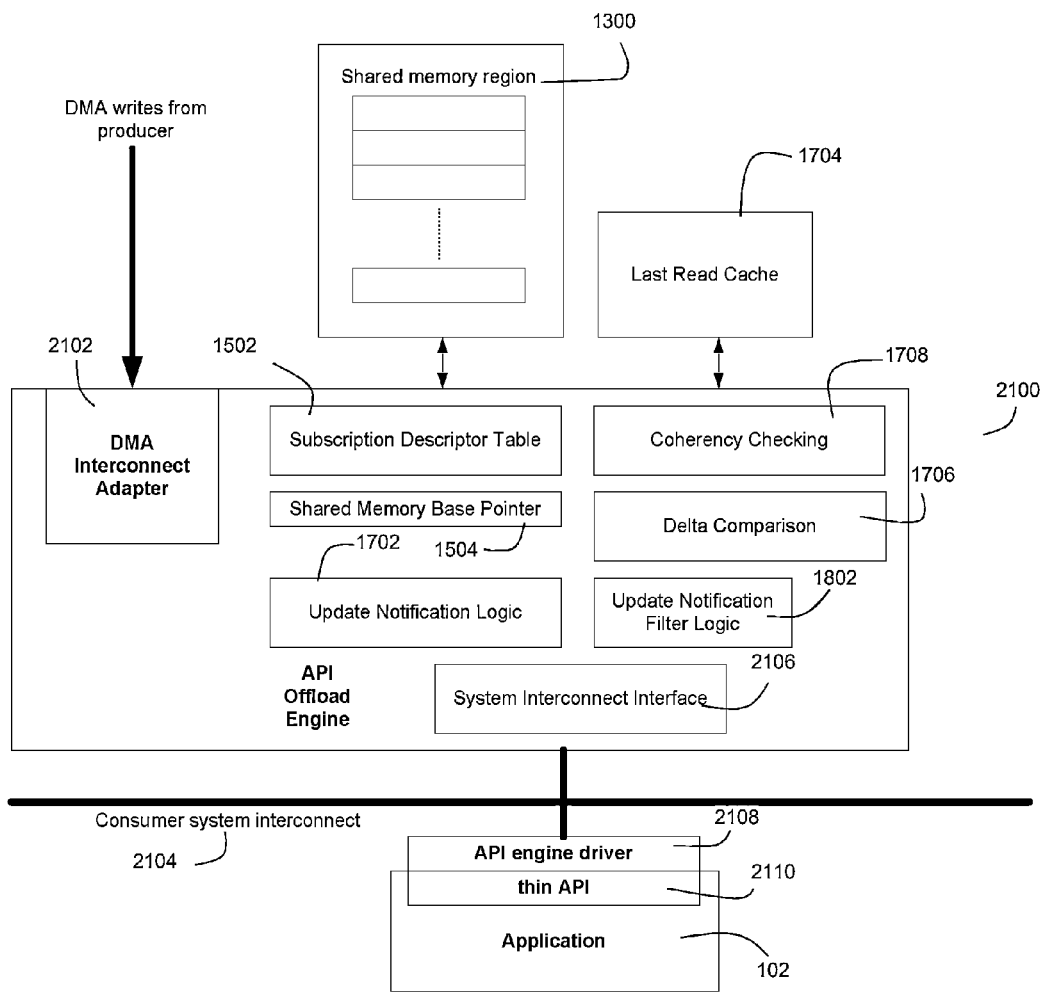
FIG. 22 depicts another exemplary API offload engine.

The example of FIG. 21 demonstrates how an adaptive transmission consumer can be realized in an API offload engine 2100. Data from the producer is received by a DMA interconnect adapter 2102 in the consumer system. In the preferred embodiment, the API offload engine 2100 allows the producer to directly write to a shared memory region 1300 directly connected to the API offload engine 2100. Note that this write transaction occurs directly over the consumer system interconnect 2104 without involvement of other processing resources in the consumer system. Alternatively, the API offload engine 2100 may include a DMA interconnect adapter 2200, as shown in FIG. 22, such that the DMA write transactions are handled exclusively within the offload engine 2100 without traversing the consumer system interconnect 2104.

The consumer API processing elements in the offload engine 2100 function as previously described. In the preferred embodiment, the offload engine includes sufficient high-speed memory to host the shared memory region 1300 and the last read cache 1704. This may be practically realized by Synchronous Random Access Memory (SRAM) or Synchronous Dynamic Random Access Memory (SDRAM) directly attached to a reconfigurable hardware device or other processing engine. The offload engine 2100 contains a system interconnect interface 2106 to communicate with one or more consumer applications. An offload engine driver 2108 provides the necessary mechanisms to allow application logic running in the consumer system to communicate with the API offload engine. This may include configuring registers, assigning the API offload engine and address range on the system interconnect, performing initialization resets, and managing the transfer of data from application logic to the API offload engine. As an example see the above-referenced and incorporated U.S. Pat. App. Pub. 2007/0174841.

A "thin" API 2110 exposes the same application programming interface (API) to consumer applications, however it does not perform any of the API processing functions. It's primary role is to pass requests for data records from the consumer application to the API offload engine, and to pass notifications of record updates and current data records from the API offload engine to the consumer application. The thin API also performs the necessary control plane functionality to establish a connection with the upstream data producer, subscribe to data items, establish notification rules with the API offload engine, etc.

Note that the API offload engine 2100 may also host the necessary logic to offload the critical transmission consumer and metered transmission consumer API logic.

Note that additional functionality may be embedded in the API offload engine such as data-type conversions (e.g. convert ASCII encoded numbers into binary representations and vice versa), etc.

While the present invention has been described above in relation to its preferred embodiments, various modifications may be made thereto that still fall within the invention's scope as will be recognizable upon review of the teachings herein. As such, the full scope of the present invention is to be defined solely by the appended claims and their legal equivalents.

What is claimed is:

1. A method for data distribution, the method comprising:
    maintaining a plurality of data records corresponding to a plurality of items, a data consumer being subscribed to information about the items, the records being indicative of a plurality of locations reserved for data about the items in a shared memory, the shared memory being shared between the data producer and the data consumer;
    receiving a plurality of events corresponding to the items; and
    adaptively distributing data representative of the events to the subscribed data consumer by (1) determining a plurality of locations in the shared memory for writing the event data based on the data records, and (2) performing a plurality of direct memory access (DMA) write operations for the event data to the shared memory at the determined locations to provide updates about the items without participation from any processing resources in the data consumer;
    wherein the adaptively distributing step is performed by a processor.

2. The method of claim 1 wherein the processor is resident in a data producer, the data producer performing the maintaining, receiving, and adaptively distributing steps, wherein a plurality of data consumers are subscribed to a plurality of the items, the records being indicative of a plurality of locations in a plurality of shared memories reserved for data about the items, each shared memory being shared between the data producer and a data consumer, and wherein the adaptively distributing step comprises the processor performing the adaptively distributing step with the different data consumers independently of any read operations from the shared memories that are performed by the data consumers.

3. The method of claim 2 further comprising:
    the data producer storing the received events in a memory cache;
    the data producer determining whether any of the data consumers are subscribers to the items corresponding to the received events; and
    the data producer performing the adaptively distributing step with respect to the event data in the cache for the data consumers that are determined to be subscribed to the items corresponding to the received events, wherein the adaptively distributing step comprises:
        when there is write congestion for the data producer, the data producer updating the cache as new event data is received with the latest event for each item such that the DMA write operation will write the latest event for a particular item rather than a most previous event for that particular item if the most previous event had not yet been distributed to its subscribed data consumer; and
        when there is read congestion for a data consumer and new event data has been received by the data producer for a particular item for which the congested data consumer has not yet read the most previous event data for that particular item written to the shared memory of the congested data consumer, the data producer overwriting the location in the shared memory for that particular item with the new event data via the DMA write operation.

4. The method of claim 2 wherein the maintaining step further comprises:
    the data producer maintaining a plurality of client distribution records (CDRs), each CDR comprising a data consumer identifier, an interface address, a base address, and a shared memory size identifier;
    the data producer maintaining a plurality of record offsets, each corresponding to one of the items;
    the method further comprising:
        the data producer maintaining a queue of pending transfers to the data consumers;
        the data producer updating the queue with events based on the receiving step; and
        the data producer performing the adaptively distributing step for the events in the queue such that the data producer DMA writes event data from the cache to the shared memories in the data consumers at locations in the shared memories determined from the CDRs and the record offsets.

5. The method of claim 4 wherein the record offsets are applicable across all of the data consumers.

6. The method of claim 4 wherein the step of maintaining the record offsets comprises the data producer maintaining different sets of record offsets for a plurality of the data consumers.

7. The method of claim 4 wherein the data producer continues to update a data record for an item in response to received new data for that item even if there is a pending transfer in the queue for that data record.

8. The method of claim 4 further comprising:
the data producer determining whether the same updated data record is pending for transfer to a plurality of data consumers; and
in response to determining that the same updated data record is pending for transfer to a plurality of data consumers, the data producer grouping the DMA write operations for the updated data record to those data consumers.

9. The method of claim 8 further comprising the data producer performing the determining step using a hash table.

10. The method of claim 8 further comprising the data producer performing the determining step using a Bloom filter.

11. The method of claim 2 wherein the data producer performs the method steps across unicast DMA-capable interconnects.

12. The method of claim 2 wherein the data producer performs the method steps across multicast DMA-capable interconnects.

13. The method of claim 1 wherein the data comprises financial market data.

14. The method of claim 1 wherein the processor is resident within an intelligent network interface card (NIC).

15. The method of claim 1 wherein the processor is co-resident with a DMA engine.

16. The method of claim 1 wherein the processor is resident within a connection multiplexer.

17. The method of claim 1 wherein the processor is resident within an edge cache device.

18. The method of claim 1 wherein the processor is resident within a ticker plant.

19. The method of claim 1 wherein the processor comprises a coprocessor.

20. The method of claim 19 wherein the coprocessor comprises a reconfigurable logic device.

21. The method of claim 19 wherein the coprocessor comprises a multi-core processor.

22. The method of claim 19 wherein the coprocessor comprises a graphics processing unit (GPU).

23. An apparatus for data distribution comprising:
a processor; and
a memory;
wherein the processor is configured to:
maintain a plurality of data records corresponding to a plurality of items in the memory, a data consumer being subscribed to information about the items, the records being indicative of a plurality of locations reserved for data about the items in a shared memory, the shared memory being shared between the data producer and the data consumer;
receive a plurality of events corresponding to the items; and
adaptively distribute data representative of the events to the subscribed data consumer, wherein as part of the adaptive distribution the processor is configured to (1) determine a plurality of locations in the shared memory for writing the event data based on the data records, and (2) perform a plurality of direct memory access (DMA) write operations for the event data to the shared memory at the determined locations to provide updates about the items without participation from any processing resources in the data consumer.

24. A method for data distribution comprising:
generating a plurality of unique data streams for a plurality of data consumers, each unique data stream corresponding to a data consumer such that the unique data streams correspond to a plurality of data consumers in the aggregate, wherein each unique data stream comprises a plurality of update events for a plurality of items, the update events in each unique data stream relating to only a set of items that are of interest to that unique data stream's corresponding data consumer; and
distributing the unique data streams to their associated data consumers via a plurality of direct memory access (DMA) write operations to a plurality of shared memories in the data consumers without processing feedback information from the data consumers; and
wherein the method steps are performed by a processor.

25. The method of claim 24 wherein the set of items that are of interest to the data consumers are the items to which each data consumer has subscribed, the method further comprising processor performing the generating step and the distributing step such that the data consumers are not required to filter out data from the unique data streams that are related to items for which the data consumers have not subscribed.

26. The method of claim 24 further comprising:
the processor tracking where to write the update events in the shared memories via a plurality of write pointers, wherein each data consumer is configured to read data from the shared memory via a read pointer, and wherein the processor has no visibility of the data consumers' read pointers when distributing the unique data streams the data consumers.

27. The method of claim 26 wherein the shared memory comprises a ring buffer.

28. The method of any of claim 27 wherein each update event comprises:
a header field;
an event field;
a checksum field; and
a blank header field.

29. The method of claim 28 wherein the header field comprises a token, a sequence and a length.

30. The method of claim 28 further comprising triggering a resynchronize operation in response to a read by the data consumer of a header field that contains an invalid unique token, an invalid message length, or an unexpected sequence number.

31. The method of claim 28 further comprising the data consumer restarting its event processing when an incorrect checksum is detected.

32. The method of claim 24 wherein the data streams comprise financial market data.

33. The method of claim 24 wherein the processor is resident within an intelligent network interface card (NIC).

34. The method of claim 24 wherein the processor is co-resident with a DMA engine.

35. The method of claim 24 wherein the processor is resident within a connection multiplexer.

36. The method of claim 24 wherein the processor is resident within an edge cache device.

37. The method of claim 24 wherein the processor is resident within a ticker plant.

38. The method of claim 24 wherein the processor comprises a coprocessor.

39. The method of claim 38 wherein the coprocessor comprises a reconfigurable logic device.

40. The method of claim 38 wherein the coprocessor comprises a multi-core processor.

41. The method of claim 38 wherein the coprocessor comprises a graphics processing unit (GPU).

42. An apparatus for data distribution comprising:
a processor configured to (1) generate a plurality of unique data streams for a plurality of data consumers, each unique data stream corresponding to a data consumer such that the unique data streams correspond to a plurality of data consumers in the aggregate, wherein each unique data stream comprises a plurality of update events for a plurality of items, the update events in each unique data stream relating to only a set of items that are of interest to that unique data stream's corresponding data consumer, and (2) distribute the unique data streams to their associated data consumers via a plurality of direct memory access (DMA) write operations to a plurality of shared memories in the data consumers without processing feedback information from the data consumers.

43. A method for data distribution, the method comprising:
maintaining a plurality of data records corresponding to a plurality of items for which event data is to be distributed to a plurality of data consumers on a metered basis, the records identifying the subscribed data consumers for each item and metering data for each subscribed data consumer for each item such that the records support differing metering rates for a plurality of same items with respect to a plurality of different data consumers and differing metering rates for a plurality of different items with respect to a plurality of same data consumers;
receiving a plurality of events corresponding to the items; and
performing a metered distribution of data relating to the received events to the data consumers based on the data records such that the data distribution is metered on a per-data consumer/per item basis in accordance with the metering data in the data records that are applicable to the items corresponding to the received events; and
wherein the performing step is performed by a processor.

44. The method of claim 43 wherein the processor is resident in a data producer, the data producer performing the maintaining, receiving, and metered distribution steps, wherein the metering data comprises, for each item with respect to each subscribed data consumer for that item, (1) a meter rate applicable to the item-subscribed data consumer pair, and (2) a last time sent applicable to the item-subscribed data consumer pair.

45. The method of claim 44 wherein the metered distribution performing step utilizes a timing wheel with constant insertion time.

46. The method of claim 45 further comprising the processor performing a fanout operation, and wherein the processor performs the metered distribution and fanout operations independently.

47. The method of claim 44 further comprising the processor classifying data into metered and real-time classes on a per-event basis, the method further comprising the processor performing the metered distribution for the event data classified into the metered class.

48. The method of claim 47 further comprising the processor performing a fanout operation, and wherein the data classification, metered distribution, and fanout processing is performed in parallel.

49. The method of claim 43 wherein each data record comprises:
a client data map that maintains a list of data consumers with subscriptions to the data item;
a data item index number;
a global dirty bit;
a global last time sent;
a current image of the data item record;
a size of the data item record image.

50. The method of claim 49 wherein the client data map comprises:
a dirty bit;
a last time sent;
a client-specific meter rate.

51. The method of claim 43 wherein the processor is resident within a data distribution node.

52. The method of claim 43 wherein the data comprises financial market data.

53. The method of claim 43 wherein the processor is resident within an intelligent network interface card (NIC).

54. The method of claim 43 wherein the processor is co-resident with a DMA engine.

55. The method of claim 43 wherein the processor is resident within a connection multiplexer.

56. The method of claim 43 wherein the processor is resident within an edge cache device.

57. The method of claim 43 wherein the processor is resident within a ticker plant.

58. The method of claim 43 wherein the processor comprises a coprocessor.

59. The method of claim 58 wherein the coprocessor comprises a reconfigurable logic device.

60. The method of claim 58 wherein the coprocessor comprises a multi-core processor.

61. The method of claim 58 wherein the coprocessor comprises a graphics processing unit (GPU).

62. An apparatus for data distribution comprising:
a processor; and
a memory;
wherein the processor is configured to:
maintain a plurality of data records in the memory, the data records corresponding to a plurality of items for which event data is to be distributed to a plurality of data consumers on a metered basis, the records identifying the subscribed data consumers for each item and metering data for each subscribed data consumer for each item such that the records support differing metering rates for a plurality of same items with respect to a plurality of different data consumers and differing metering rates for a plurality of different items with respect to a plurality of same data consumers;
receive a plurality of events corresponding to the items; and
perform a metered distribution of data relating to the received events to the data consumers based on the data records such that the data distribution is metered on a per-data consumer/per-item basis in accordance with the metering data in the data records that are applicable to the items corresponding to the received events.

63. An apparatus for distributing data, the apparatus comprising:
a multi-class distribution engine (MDE), the MDE configured to distribute a plurality of events corresponding to a plurality of items and belonging to a plurality of classes on a class-specific basis from a data producer to a plurality of data consumers according to at least two members of the group consisting of (1) a critical data distribution technique wherein all events are distributed to a data consumer for reading thereby, (2) an adaptive data distribution technique wherein (i) all events are distributed to a data consumer for reading thereby if no congestion exists with respect to the data producer and that data consumer, and (ii) conflated events are distributed to a data consumer for reading thereby if congestion exists with respect to the data producer and that data consumer, and (3) a metered data distribution technique wherein events are distributed to the data consumers for reading thereby in accordance with metering policies that vary on a per data consumer/per item basis.

64. The apparatus of claim 63 wherein the MDE is further configured to distribute the events on a class-specific basis from a data producer to the data consumers via a plurality of direct memory access (DMA) write operations to a plurality of shared memories in the data consumers according to at least two members of the group consisting of (1) the critical data distribution technique, (2) the adaptive data distribution technique, and (3) the metered data distribution technique.

65. The apparatus of claim 64 wherein the MDE comprises an update classification engine (UCE), the UCE configured to determine a class for each event, the MDE further configured to (1) select a distribution technique for each event from among the at least two members based on the determined class for that event, and (2) distribute the events to the data consumers in accordance distribution technique selected therefor.

66. The apparatus of claim 64 wherein the MDE comprises (1) a plurality of output interconnection interfaces, (2) a plurality of transmission engines, and (3) a scheduler configured to ensure that each transmission engine utilizes a specified fraction of the bandwidth available on the output interconnection interfaces.

67. The apparatus of claim 64 wherein the MDE is configured for processing streaming financial market data.

68. The apparatus of claim 64 wherein the MDE is resident in a distribution node.

69. The apparatus of claim 68 wherein the distribution node comprises:
a shared memory data cache;
a control plane;
a consumer distribution record memory;
the MDE;
an upstream DMA interconnect adapter; and
a downstream DMA interconnect adapter.

70. The apparatus of claim 68 wherein the distribution node comprises:
a shared memory data cache;
a control plane;
a consumer distribution record memory;
the MDE;
an upstream DMA interconnect adapter; and
a downstream message interconnect adapter.

71. The apparatus of claim 68 wherein the distribution node comprises:
a shared memory data cache;
a control plane;
a consumer distribution record memory;
the MDE;
an upstream message interconnect adapter; and
a downstream message interconnect adapter.

72. The apparatus of claim 64 wherein the MDE is further configured to select a data distribution technique from among the group according to a static configuration.

73. The apparatus of claim 64 wherein the MDE is further configured to dynamically select a data distribution technique from among the group.

74. The apparatus of claim 64 wherein the MDE is resident within a connection multiplexer.

75. The apparatus of claim 64 wherein the MDE is resident within an edge cache device.

76. The apparatus of claim 64 wherein the MDE is resident within a ticker plant.

77. The apparatus of claim 64 wherein the MDE is resident on a coprocessor.

78. The apparatus of claim 77 wherein the coprocessor comprises a reconfigurable logic device.

79. The apparatus of claim 77 wherein the coprocessor comprises a multi-core processor.

80. The apparatus of claim 77 wherein the coprocessor comprises a graphics processing unit (GPU).

81. A method for distributing data comprising:
receiving a plurality of events for distribution to a plurality of data consumers, the events corresponding to a plurality of items;
determining a class for each received event from among a plurality of classes;
selecting a distribution technique for each received event from among a plurality of distribution techniques based on the class determined therefor, the plurality of distribution techniques comprising at least two members of the group consisting of (1) a critical data distribution technique wherein all events are distributed to a data consumer for reading thereby, (2) an adaptive data distribution technique wherein (i) all events are distributed to a data consumer for reading thereby if no congestion exists with respect to the data producer and that data consumer, and (ii) conflated events are distributed to a data consumer for reading thereby if congestion exists with respect to the data producer and that data consumer, and (3) a metered data distribution technique wherein events are distributed to the data consumers for reading thereby in accordance with metering policies that vary on a per data consumer/per item basis; and
distributing the events on a class-specific basis to the data consumers according to the selected distribution technique for each event; and
wherein the method steps are performed by a multi-class distribution engine (MDE).

82. A method for data consumption comprising:
receiving data in a shared memory via DMA write operations from a data producer;
maintaining a table that identifies locations in the shared memory data where a plurality of items can be found;
receiving a read request corresponding to an item;
accessing the maintained table in response to the received read request to determine the location where data for the item corresponding to the read request can be found;
reading data from the shared memory at the location determined in response to the accessing step; and
performing a coherency checking operation on the read data;
wherein the method steps are performed by a processor.

83. The method of claim 82 further comprising:
the processor generating a notification when new data for an item has been written to the shared memory by the data producer; and
wherein the read request receiving step comprises the processor receiving the read request in response to the generated notification.

84. The method of claim 83 further comprising:
maintaining a last record cache; and
the processor performing a delta comparison operation between the data read from the shared memory and data within the last record cache to determine which record fields were updated and to indicate the updated fields to a data consumer.

85. The method of claim 83 further comprising:
maintaining a plurality of update notification filter rules specified by the data consumer; and
the processor performing a filtering operation to determine whether to notify the data consumer that an update has occurred for a subscribed data item.

86. The method of claim 83 further comprising:
the processor processing the generated notifications to determine whether the notifications should be passed to a plurality of consuming applications.

87. The method of claim 83 wherein the data comprises financial market data.

88. The method of claim 83 wherein the processor comprises a coprocessor.

89. The method of claim 88 wherein the coprocessor comprises a reconfigurable logic device.

90. The method of claim 88 wherein the coprocessor comprises a multi-core processor.

91. The method of claim 88 wherein the coprocessor comprises a graphics processing unit (GPU).

92. The method of claim 82 wherein the processor is co-resident with a DMA engine in direct communication with a DMA interconnect adapter such that data is written to shared memory directly accessible by the processor and data need not cross a data consumer system interconnect into system memory or require involvement by system software.

93. An apparatus comprising:
a processor configured to (1) receive data in a shared memory via DMA write operations from a data producer, (2) maintain a table that identifies locations in the shared memory data where a plurality of items can be found, (3) receive a read request corresponding to an item, (4) access the maintained table in response to the received read request to determine the location where data for the item corresponding to the read request can be found, (5) read data from the shared memory at the location determined in response to the access operation, and (6) perform a coherency checking operation on the read data.

94. The apparatus of claim 93 wherein the processor is resident on a reconfigurable logic device to offload an application programming interface (API) function from a data consumer.

95. The apparatus of claim 94 further comprising a direct memory access (DMA) interconnect adapter in communication with the reconfigurable logic device.

96. A method for data distribution comprising:
receiving a plurality of events for distribution to a plurality of data consumers;
determining a class for the events from among a plurality of classes;
selectively delivering the events to a first queue or a second queue based on the determined classes for the events;
a metering engine reading events from the first queue;
the metering engine performing a metering function on the events read from the first queue to control a metered transmission of the events read from the first queue;
the metering engine delivering metered events to a third queue in accordance with the metering function;
a fanout engine downstream from the metering engine reading events from the second queue and metered events from the third queue;
the fanout engine distributing the read events from the second and third queues to the data consumers such that the events in the second queue are distributed to the data consumers on a non-metered basis and the events in the third queue are distributed to the data consumers on the metered basis.

97. The method of claim 96 wherein the metering engine and the fanout engine are resident on a reconfigurable logic device, the metering engine and the fanout engine operating simultaneously with respect to each other as the streaming events are received and processed.

98. The method of claim 97 wherein the events comprise a plurality of financial market data messages.

99. The method of claim 96 wherein the second queue is for real-time data traffic, and wherein the distributing step comprises the fanout engine distributing the events in the second queue to the data consumers on a real-time basis and distributing the events in the third queue to the data consumers on the metered basis.

* * * * *